US012621627B2

(12) United States Patent
Namba et al.

(10) Patent No.: US 12,621,627 B2
(45) **Date of Patent: *May 5, 2026**

(54) SIGNAL PROCESSING DEVICE, SIGNAL PROCESSING METHOD, AND PROGRAM

(71) Applicant: Sony Group Corporation, Tokyo (JP)

(72) Inventors: Ryuichi Namba, Tokyo (JP); Makoto Akune, Tokyo (JP); Keiichi Aoyama, Tokyo (JP); Yoshiaki Oikawa, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 54 days.

This patent is subject to a terminal disclaimer.

(21) Appl. No.: 18/666,237

(22) Filed: May 16, 2024

(65) Prior Publication Data

US 2024/0314513 A1 Sep. 19, 2024

Related U.S. Application Data

(63) Continuation of application No. 17/619,179, filed as application No. PCT/JP2020/022787 on Jun. 10, 2020, now Pat. No. 11,997,472.

(30) Foreign Application Priority Data

Jun. 21, 2019 (JP) ................................ 2019-115406

(51) Int. Cl.
*H04S 7/00* (2006.01)

(52) U.S. Cl.
CPC ........... *H04S 7/303* (2013.01); *H04S 2400/11* (2013.01); *H04S 2420/01* (2013.01); *H04S 2420/13* (2013.01)

(58) Field of Classification Search
CPC .. H04S 7/303; H04S 2400/11; H04S 2420/01; H04S 2420/13

(Continued)

(56) References Cited

U.S. PATENT DOCUMENTS 9,774,976 B1 9/2017 Baumgarte
2004/0196983 A1* 10/2004 Kushida ................ G10K 15/12 84/630

(Continued)

FOREIGN PATENT DOCUMENTS

CN 1658709 A 8/2005
CN 105323684 A 2/2016

(Continued)

OTHER PUBLICATIONS

†U.S. Appl. No. 17/619,179, filed Dec. 14, 2021, Namba et al.

(Continued)

*Primary Examiner* — William A Jerez Lora
(74) *Attorney, Agent, or Firm* — Wolf, Greenfield & Sacks, P.C.

(57) ABSTRACT

The present technology relates to a signal processing device, signal processing method, and program capable of providing a higher realistic feeling.

A signal processing device includes: an acquisition unit that acquires audio data of an audio object and metadata including position information indicating a position of the audio object and direction information indicating a direction of the audio object; and a signal generation unit that generates a reproduction signal for reproducing a sound of the audio object at a listening position on the basis of listening position information indicating the listening position, listener direction information indicating a direction of a listener at the listening position, the position information, the direction information, and the audio data. The present technology is applicable to a transmission reproduction system.

20 Claims, 11 Drawing Sheets

(58) Field of Classification Search
USPC .............................................. 381/56, 58, 303
See application file for complete search history.

(56) References Cited

U.S. PATENT DOCUMENTS

| | | | | |
|---|---|---|---|---|
| 2016/0212272 | A1* | 7/2016 | Srinivasan ....... | H04N 21/41407 |
| 2016/0359943 | A1* | 12/2016 | Huang ................ | H04M 7/0084 |
| 2017/0366912 | A1 | 12/2017 | Stein et al. | |
| 2017/0366913 | A1 | 12/2017 | Stein | |
| 2022/0360931 | A1 | 11/2022 | Namba et al. | |

FOREIGN PATENT DOCUMENTS

| | | | |
|---|---|---|---|
| CN | 105900456 | A | 8/2016 |
| CN | 109417678 | A | 3/2019 |
| JP | 2015530824 | A | 10/2015 |
| KR | 20180039409 | A | 4/2018 |
| WO | WO 2015/107926 | A1 | 7/2015 |
| WO | WO-2017098949 | A1 | 6/2017 |
| WO | WO-2018180531 | A1 | 10/2018 |
| WO | WO 2019/116890 | A1 | 6/2019 |

OTHER PUBLICATIONS

PCT/JP2020/022787, Sep. 24, 2020, *International Search Report and Written Opinion, Y.
International Search Report and Written Opinion and English translation thereof mailed Sep. 24, 2020 in connection with International Application No. PCT/JP2020/022787.

* cited by examiner

FIG. 3

| Syntax | No. of bits | Mneumonic |
|---|---|---|
| Object_metadata() | | |
| { | | |
| For (i=1:object_count) { | | |
| Object_type_index | 3 | uimsbf |
| Object_position[3] // xyz COORDINATES ($x_O$, $y_O$, $z_O$) IN COORDINATE SYSTEM OF TARGET SPACE | 6x3 | tcimsbf |
| Object_direction[3] // yaw(AZIMUTH ANGLE)$\psi_O$, pitch(ELEVATION ANGLE)$\theta_O$, roll(LEFT AND RIGHT TILT ANGLE)$\varphi_O$ | 6x3 | tcimsbf |
| } | | |
| } | | |

FIG. 4

| Syntax | No. of bits | Mneumonic |
|---|---|---|
| Object_directivity(type_index) | | |
| { | | |
| Object_directivity[distance][azimuth][elevation] | Distance * azimuth * elevation * 16 | tcimsbf |
| } | | |

SIGNAL PROCESSING DEVICE, SIGNAL PROCESSING METHOD, AND PROGRAM

CROSS-REFERENCE TO RELATED APPLICATIONS

This application claims the benefit under 35 U.S.C. § 120 as a continuation application of U.S. application Ser. No. 17/619,179, filed on Dec. 14, 2021, now U.S. Pat. No. 11,997,472, which claims the benefit under 35 U.S.C. § 371 as a U.S. National Stage Entry of International Application No. PCT/JP2020/022787, filed in the Japanese Patent Office as a Receiving Office on Jun. 10, 2020, which claims priority to Japanese Patent Application Number JP2019-115406, filed in the Japanese Patent Office on Jun. 21, 2019, each of which is hereby incorporated by reference in its entirety.

TECHNICAL FIELD

The present technology relates to a signal processing device, signal processing method, and program, and more particularly relates to a signal processing device, signal processing method, and program capable of providing a higher realistic feeling.

BACKGROUND ART

For example, in order to reproduce a sound field from a free viewpoint such as a bird's-eye view or a walk-through, it is important to record a target sound such as a voice of a person, a motion sound of a player such as a ball kicking sound in sports, or a musical instrument sound in music at a signal to noise ratio (SNR) as high as possible.

Further, at the same time, it is necessary to reproduce a sound with accurate localization for each sound source of the target sound and to cause sound image localization and the like to follow movement of a viewpoint or the sound source.

By the way, a technology capable of providing a higher realistic feeling in a free-viewpoint or fixed-viewpoint content has been desired, and a large number of such technologies have been proposed.

For example, as a technology regarding reproduction of a sound field from a free viewpoint, there is proposed a technology for, in a case where a user can freely designate a listening position, performing gain correction and frequency characteristic correction in accordance with a distance from a changed listening position to an audio object (see, for example, Patent Document 1).

CITATION LIST

Patent Document

Patent Document 1: WO 2015/107926 A

SUMMARY OF THE INVENTION

Problems to be Solved by the Invention

However, the technology cited above cannot provide a sufficiently high realistic feeling in some cases.

For example, a sound source is not a point sound source in the real world, and a sound wave propagates from a sounding body having a size with a specific directional characteristic including reflection and diffraction caused by the sounding body.

A large number of attempts to record a sound field in a target space have been made, however, currently, and even in a case where recording is performed for each sound source, that is, for each audio object, a sufficiently high realistic feeling cannot be obtained in some cases because a direction of each audio object is not considered on a reproduction side.

The present technology has been made in view of such a situation, and an object thereof is to provide a higher realistic feeling.

Solutions to Problems

A signal processing device according to one aspect of the present technology includes: an acquisition unit that acquires audio data of an audio object and metadata including position information indicating a position of the audio object and direction information indicating a direction of the audio object; and a signal generation unit that generates a reproduction signal for reproducing a sound of the audio object at a listening position on the basis of listening position information indicating the listening position, listener direction information indicating a direction of a listener at the listening position, the position information, the direction information, and the audio data.

A signal processing method or a program according to one aspect of the present technology includes: a step of acquiring audio data of an audio object and metadata including position information indicating a position of the audio object and direction information indicating a direction of the audio object; and a step of generating a reproduction signal for reproducing a sound of the audio object at a listening position on the basis of listening position information indicating the listening position, listener direction information indicating a direction of a listener at the listening position, the position information, the direction information, and the audio data.

In one aspect of the present technology, audio data of an audio object and metadata including position information indicating a position of the audio object and direction information indicating a direction of the audio object are acquired, and a reproduction signal for reproducing a sound of the audio object at a listening position is generated on the basis of listening position information indicating the listening position, listener direction information indicating a direction of a listener at the listening position, the position information, the direction information, and the audio data.

BRIEF DESCRIPTION OF DRAWINGS

FIG. 3 illustrates a syntax example of metadata.

FIG. 4 illustrates a syntax example of directional characteristic data.

MODE FOR CARRYING OUT THE INVENTION

Figure 1:
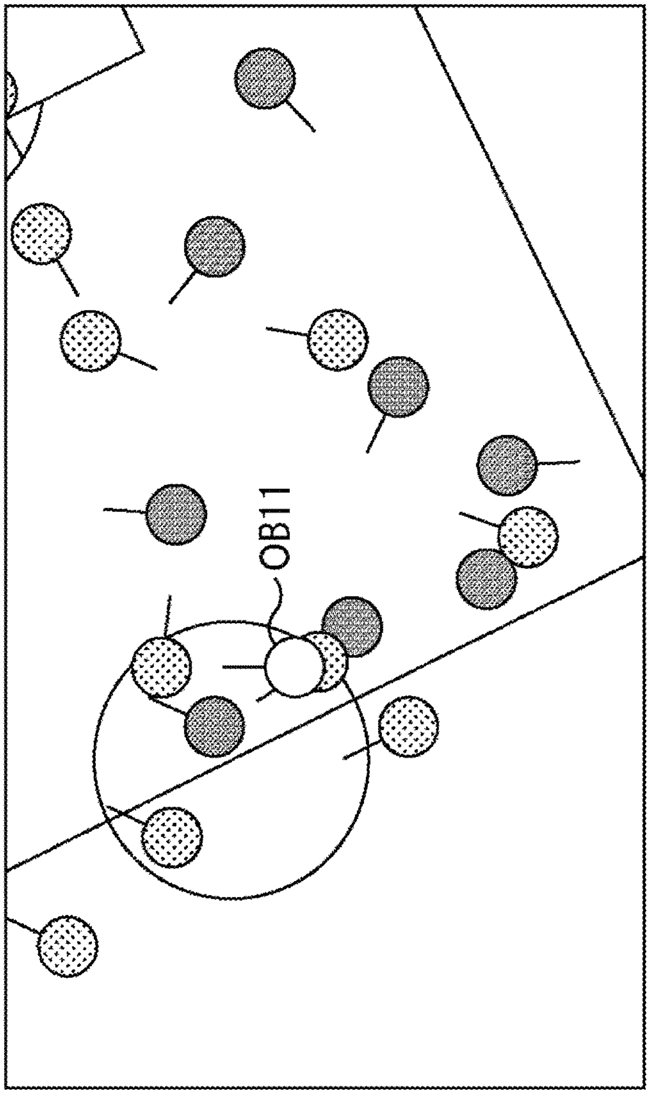
FIG. 1 is an explanatory view of a direction of an object included in content.

Hereinafter, embodiments to which the present technology is applied will be described with reference to the drawings.

First Embodiment

<Present Technology>

The present technology relates to a transmission reproduction system capable of providing a higher realistic feeling by appropriately transmitting directional characteristic data indicating a directional characteristic of an audio object serving as a sound source and reflecting the directional characteristic of the audio object in reproduction of content on a content reproduction side on the basis of the directional characteristic data.

The content for reproducing a sound of the audio object (hereinafter, also simply referred to as an object) serving as a sound source is, for example, a fixed-viewpoint content or free-viewpoint content.

In the fixed-viewpoint content, a position of a viewpoint of a listener, that is, a listening position (listening point) is set as a predetermined fixed position, whereas, in the free-viewpoint content, a user who is the listener can freely designate the listening position (viewpoint position) in real time.

In the real world, each sound source has a unique directional characteristic. That is, even sounds emitted from the same sound source have different sound transfer characteristics depending on directions viewed from the sound source.

Therefore, in a case where the object serving as a sound source in the content or the listener at the listening position freely moves or rotates, how the listener hears a sound of the object also changes according to the directional characteristic of the object.

In reproduction of the content, processing for reproducing distance attenuation in accordance with a distance from the listening position to the object is generally performed. Meanwhile, the present technology reproduces the content in consideration of not only distance attenuation but also the directional characteristic of the object, thereby providing a higher realistic feeling.

That is, in a case where the listener or object freely moves or rotates in the present technology, a transfer characteristic according to the distance attenuation and the directional characteristic is dynamically added to a sound of the content for each object in consideration of not only a distance between the listener and the object but also, for example, a relative direction between the listener and the object.

The transfer characteristic is added by, for example, gain correction according to the distance attenuation and the directional characteristic, processing for wave field synthesis based on a wavefront amplitude and a phase propagation characteristic in which the distance attenuation and the directional characteristic are considered, or the like.

The present technology uses directional characteristic data to add the transfer characteristic according to the directional characteristic. In a case where the directional characteristic data is prepared corresponding to each target sound source, that is, each type of object, it is possible to provide a higher realistic feeling.

For example, the directional characteristic data for each type of object can be obtained by recording a sound by using a microphone array or the like or by performing a simulation in advance and calculating a transfer characteristic for each direction and each distance when a sound emitted from the object propagates through a space.

The directional characteristic data for each type of object is transmitted in advance to a device on a reproduction side together with or separately from audio data of the content.

Then, when reproducing the content, the device on the reproduction side uses the directional characteristic data to add the transfer characteristic according to the distance from the object and the directional characteristic to the audio data of the object, that is, to a reproduction signal for reproducing the sound of the content.

This makes it possible to reproduce the content with a higher realistic feeling.

In the present technology, a transfer characteristic according to a relative positional relationship between the listener and the object, that is, according to a relative distance or direction therebetween is added for each type of sound source (object). Therefore, even in a case where the object and the listening position are equally distant, how the listener hears the sound of the object changes depending on from which direction the listener hears the sound. This makes it possible to reproduce a more realistic sound field.

Examples of the content to which the present technology is suitably applied include the following content:

- Content that reproduces a field in which a team sport is performed;
- Content that reproduces a space in which a plurality of performers exists, such as a musical, opera, or play;
- Content that reproduces an arbitrary space in a live show venue or theme park;
- Content that reproduces performance of an orchestra, marching band, or the like; and
- Content such as a game.

Note that the performers may stand still or move in, for example, content of performance of a marching band or the like.

Next, hereinafter, the present technology will be described in more detail.

For example, there will be described an example where content reproduces a sound field in which an arbitrary position on a soccer field is set as a listening position.

In this case, for example, as illustrated in FIG. 1, there are players of each team and referees on the field, and these players and referees are sound sources, that is, audio objects.

In the example of FIG. 1, each circle in FIG. 1 represents a player or referee, that is, an object, and a direction of a line segment attached to each circle represents a direction in which the player or referee represented by the circle faces, that is, a direction of the object such as the player or referee.

Herein, those objects face in different directions at different positions, and the positions and directions of the objects change with time. That is, each object moves or rotates with time.

For example, an object OB11 is a referee, and a video and audio, which are obtained in a case where a position of the object OB11 is set as a viewpoint position (listening position) and an upward direction in FIG. 1 that is a direction of the object OB11 is set as a line-of-sight direction, are presented to the listener as content as an example.

Each object is located on a two-dimensional plane in the example of FIG. 1, but, in practice, the players and referees each serving as the object are different in a height of a mouth, a height of a foot that is a position at which a ball kicking sound is generated, and the like. Further, a posture of the object also constantly changes.

That is, in practice, each object and the viewpoint (listening position) are both located in a three-dimensional space, and, at the same time, those objects and the listener (user) at the viewpoint face in various directions in various postures.

The following is classification of cases where a directional characteristic according to the direction of the object can be reflected in the content.

(Case 1)

A case where the object or listening position is located on a two-dimensional plane, and only an azimuth angle (yaw) indicating the direction of the object is considered, whereas an elevation angle (pitch) or tilt angle (roll) is not considered.

(Case 2)

A case where the object or listening position is located in a three-dimensional space, and an azimuth angle and elevation angle indicating the direction of the object are considered, whereas a tilt angle indicating rotation of the object is not considered.

(Case 3)

A case where the object or listening position is located in a three-dimensional space, and an Euler angle is considered, the Euler angle including an azimuth angle and elevation angle indicating the direction of the object and a tilt angle indicating rotation of the object.

The present technology is applicable to any of the above cases 1 to 3, and, in each case, the content is reproduced in consideration of the listening position, location of the object, and the direction and rotation (tilt) of the object, that is, a rotation angle thereof as appropriate.

<Transmission Device>

The transmission reproduction system that transmits and reproduces such content includes, for example, a transmission device that transmits data of the content and a signal processing device functioning as a reproduction device that reproduces the content on the basis of the data of the content transmitted from the transmission device. Note that one or a plurality of signal processing devices may function as the reproduction device.

The transmission device on a transmission side of the transmission reproduction system transmits, for example, audio data for reproducing a sound of each of one or a plurality of objects included in the content and metadata of each object (audio data) as the data of the content.

Herein, the metadata includes sound source type information, sound source position information, and sound source direction information.

The sound source type information is ID information indicating a type of the object serving as a sound source.

For example, the sound source type information may be information unique to the sound source such as a player or musical instrument, which indicates the type (kind) of object itself serving as the sound source, or may be information indicating the type of sound emitted from the object, such as a player's voice, ball kicking sound, clapping sound, or other motion sounds.

In addition, the sound source type information may be information indicating the type of object itself and the type of sound emitted from the object.

Further, directional characteristic data is prepared for each type indicated by the sound source type information, and a reproduction signal is generated on the reproduction side on the basis of the directional characteristic data determined for the sound source type information. Therefore, it can also be said that the sound source type information is ID information indicating the directional characteristic data.

In the transmission device, the sound source type information is, for example, manually assigned to each object included in the content and is included in the metadata of the object.

Further, the sound source position information included in the metadata indicates a position of the object serving as the sound source.

Herein, the sound source position information is, for example, a latitude and longitude indicating an absolute position on the earth's surface measured (acquired) by a position measurement module such as a global positioning system (GPS) module, coordinates obtained by converting the latitude and longitude into distances, or the like.

In addition, the sound source position information may be any information as long as the information indicates the position of the object, such as coordinates in a coordinate system having, as a reference position, a predetermined position in a target space (target area) in which the content is to be recorded.

Further, in a case where the sound source position information is coordinates (coordinate information), the coordinates may be coordinates in any coordinate system, such as coordinates in a polar coordinate system including an azimuth angle, elevation angle, and radius, coordinates in an xyz coordinate system, that is, coordinates in a three-dimensional orthogonal coordinate system, or coordinates in a two-dimensional orthogonal coordinate system.

Furthermore, the sound source direction information included in the metadata indicates an absolute direction in which the object at the position indicated by the sound source position information faces, that is, a front direction of the object.

Note that the sound source direction information may include not only the information indicating the direction of the object but also information indicating rotation (tilt) of the object. Hereinafter, the sound source direction information includes the information indicating the direction of the object and the information indicating the rotation of the object.

Specifically, for example, the sound source direction information includes an azimuth angle $\psi_o$ and elevation angle $\theta_o$ indicating the direction of the object in the coordinate system of the coordinates serving as the sound source position information, and a tilt angle $\varphi_o$ indicating the rotation (tilt) of the object in the coordinate system of the coordinates serving as the sound source position information.

In other words, it can be said that the sound source direction information indicates the Euler angle including the azimuth angle $\psi_o$ (yaw), the elevation angle $\theta_o$ (pitch), and the tilt angle $\varphi_o$ (roll) indicating an absolute direction and rotation of the object. For example, the sound source direction information can be obtained from a geomagnetic sensor attached to the object, video data in which the object serves as a subject, or the like.

The transmission device generates, for each object, the sound source position information and the sound source direction information for each frame of the audio data or for each discretized unit time such as for a predetermined number of frames, that is, at predetermined time intervals.

Then, the metadata including the sound source type information, the sound source position information, and the sound source direction information is transmitted to the signal processing device together with the audio data of the object for each unit time such as for each frame.

Further, the transmission device transmits the directional characteristic data in advance or sequentially to the signal processing device on the reproduction side for each sound source type indicated by the sound source type information. Note that the signal processing device may acquire the directional characteristic data from a device or the like different from the transmission device.

The directional characteristic data indicates a directional characteristic of the object of the sound source type indicated by the sound source type information, that is, a transfer characteristic in each direction viewed from the object.

Figure 2:
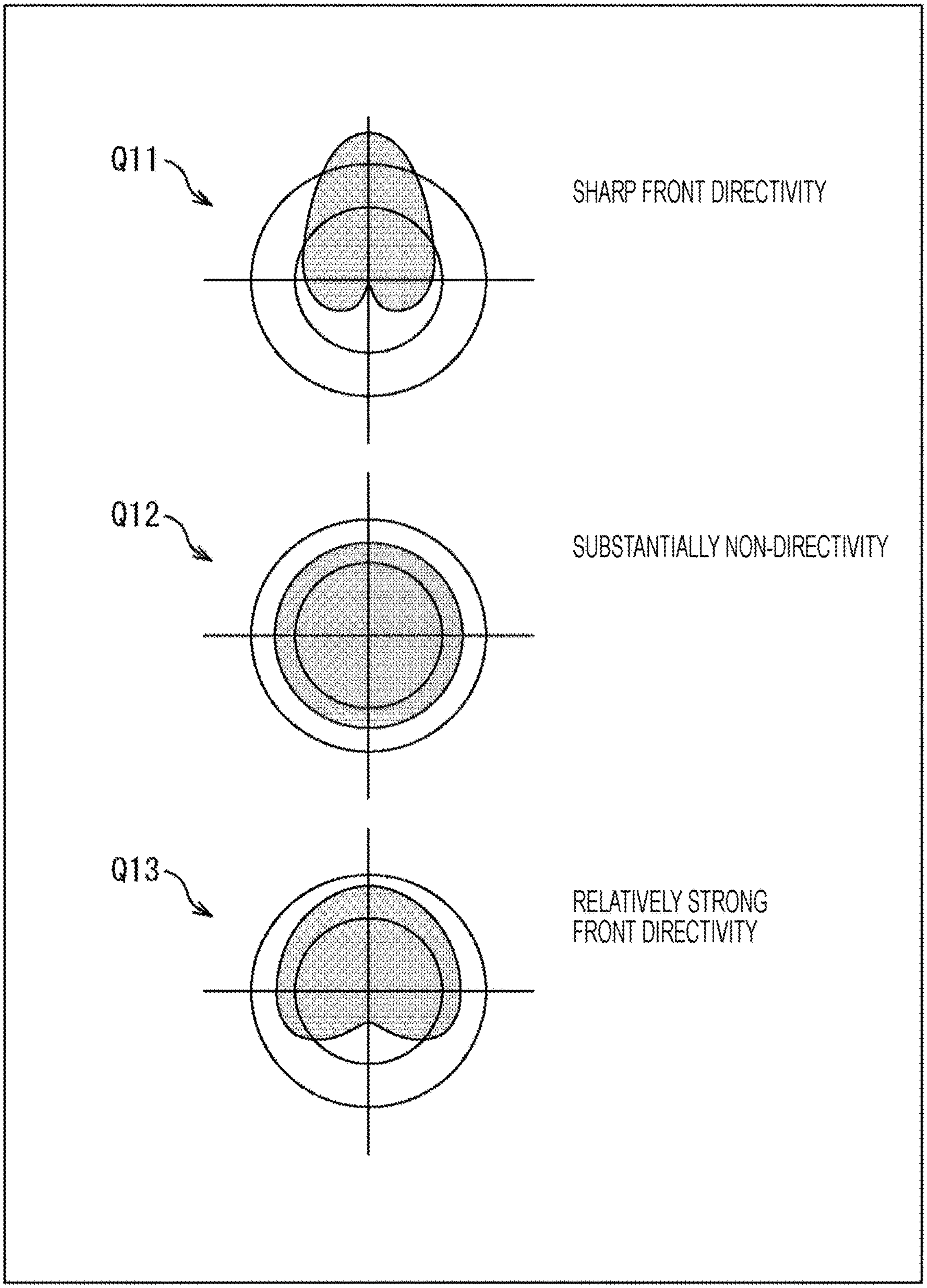
FIG. 2 is an explanatory view of a directional characteristic of an object.

For example, as illustrated in FIG. 2, each sound source has a directional characteristic specific to the sound source.

In an example of FIG. 2, for example, a whistle serving as the sound source has a directional characteristic in which a sound strongly propagates in a front (forward) direction, that is, has a sharp front directivity as indicated by an arrow Q11.

Further, for example, a footstep emitted from a spike or the like serving as the sound source has a directional characteristic (non-directivity) in which a sound propagates with substantially the same strength in all directions as indicated by an arrow Q12.

Furthermore, for example, a voice emitted from a mouth of a player serving as the sound source has a directional characteristic in which a sound strongly propagates toward the front and sides, that is, has a relatively strong front directivity as indicated by an arrow Q13.

Directional characteristic data indicating the directional characteristics of such sound sources can be obtained by acquiring a propagation characteristic (transfer characteristic) of a sound to the surroundings for each sound source type by using a microphone array in, for example, an anechoic chamber or the like. In addition, the directional characteristic data can also be obtained by, for example, performing a simulation on 3D data in which a shape of the sound source is simulated.

Specifically, the directional characteristic data is, for example, a gain function dir(i, $\psi$, $\theta$) defined as a function of an azimuth angle $\psi$ and elevation angle $\theta$ indicating a direction viewed from the sound source, the function being determined for a value i of an ID indicating the sound source type.

Further, a gain function dir(i, d, $\psi$, $\theta$) having not only the azimuth angle $\psi$ and the elevation angle $\theta$ but also a distance d from a discretized sound source as arguments may be used as the directional characteristic data.

In this case, when each argument is substituted into the gain function dir(i, d, $\psi$, $\theta$), a gain value indicating a sound transfer characteristic (propagation characteristic) is obtained as an output of the gain function dir(i, d, $\psi$, $\theta$).

The gain value indicates a characteristic (transfer characteristic) of a sound that is emitted from the sound source of the sound source type whose ID value is i, propagates in a direction of the azimuth angle $\psi$ and elevation angle $\theta$ viewed from the sound source, and reaches a position (hereinafter, referred to as a position P) at the distance d from the sound source.

Therefore, in a case where audio data of the sound source type whose ID value is i is subjected to gain correction on the basis of the gain value, it is possible to reproduce the sound emitted from the sound source of the sound source type whose ID value is i and supposed to be actually heard at the position P.

In particular, in this example, in a case where the gain value serving as the output of the gain function dir(i, d, $\psi$, $\theta$) is used, it is possible to achieve gain correction for adding the transfer characteristic indicated by the directional characteristic in which the distance from the sound source, that is, distance attenuation is considered.

Note that the directional characteristic data may be, for example, a gain function indicating the transfer characteristic in which a reverberation characteristic or the like is also considered. In addition, the directional characteristic data may be, for example, Ambisonics format data, that is, data including a spherical harmonic coefficient (spherical harmonic spectrum) in each direction.

The transmission device transmits the directional characteristic data prepared for each sound source type as described above to the signal processing device on the reproduction side.

Herein, a specific example of transmitting the metadata and the directional characteristic data will be described.

For example, the metadata is prepared for each frame having a predetermined time length of the audio data of the object, and the metadata is transmitted for each frame to the reproduction side by using a bitstream syntax illustrated in FIG. 3. Note that, in FIG. 3, uimsbf represents unsigned integer MSB first, and tcimsbf represents two's complement integer MSB first.

In an example of FIG. 3, the metadata includes sound source type information "Object_type_index", sound source position information "Object_position[3]", and sound source direction information "Object_direction[3]" for each object included in the content.

In particular, in this example, the sound source position information Object_position[3] is set as coordinates ($x_o$, $y_o$, $z_o$) of an xyz coordinate system (three-dimensional orthogonal coordinate system) taking, as an origin, a predetermined reference position in a target space in which the object is located. The coordinates ($x_o$, $y_o$, $z_o$) indicate an absolute position of the object in the xyz coordinate system, that is, in the target space.

Further, the sound source direction information Object_direction[3] includes the azimuth angle $\psi_o$, the elevation angle $\theta_o$, and the tilt angle $\varphi_o$ indicating an absolute direction of the object in the target space.

For example, in a free-viewpoint content, a viewpoint (listening position) changes with time during reproduction of the content. Therefore, it is advantageous to generate a reproduction signal when the position of the object is expressed by coordinates indicating the absolute position, instead of relative coordinates based on the listening position.

Meanwhile, for example, in a case of a fixed-viewpoint content, coordinates of a polar coordinate system including an azimuth angle and elevation angle indicating a direction of the object viewed from the listening position and a radius indicating a distance from the listening position to the object are preferably set as the sound source position information indicating the position of the object.

Note that the configuration of the metadata is not limited to the example of FIG. 3 and may be any other configuration. Further, it is only necessary to transmit the metadata at predetermined time intervals, and it is not always necessary to transmit the metadata for each frame.

Furthermore, the directional characteristic data of each sound source type may be stored in the metadata and then be transmitted, or may be transmitted in advance separately from the metadata and the audio data by using, for example, a bitstream syntax illustrated in FIG. 4.

In an example of FIG. 4, a gain function "Object_directivity[distance] [azimuth] [elevation]" having a distance "distance" from the sound source and an azimuth angle "azimuth" and elevation angle "elevation" indicating a direction viewed from the sound source as arguments are transmitted as directional characteristic data corresponding to a value of predetermined sound source type information.

Note that the directional characteristic data may be data in a format in which sampling intervals of the azimuth angle and elevation angle serving as the arguments are not equi-angular intervals, or may be data in a higher order Ambisonmics (HOA) format, that is, in an Ambisonics format (spherical harmonic coefficient).

For example, directional characteristic data of a general sound source type is preferably transmitted to the reproduction side in advance.

Meanwhile, directional characteristic data of a sound source having a non-general directional characteristic, such as an object that is not defined in advance, may be included in the metadata of FIG. 3 and be transmitted as the metadata.

As described above, the metadata, the audio data, and the directional characteristic data are transmitted from the transmission device to the signal processing device on the reproduction side.

<Configuration Example of Signal Processing Device>

Next, the signal processing device, which is a device on the reproduction side, will be described.

Figure 5:
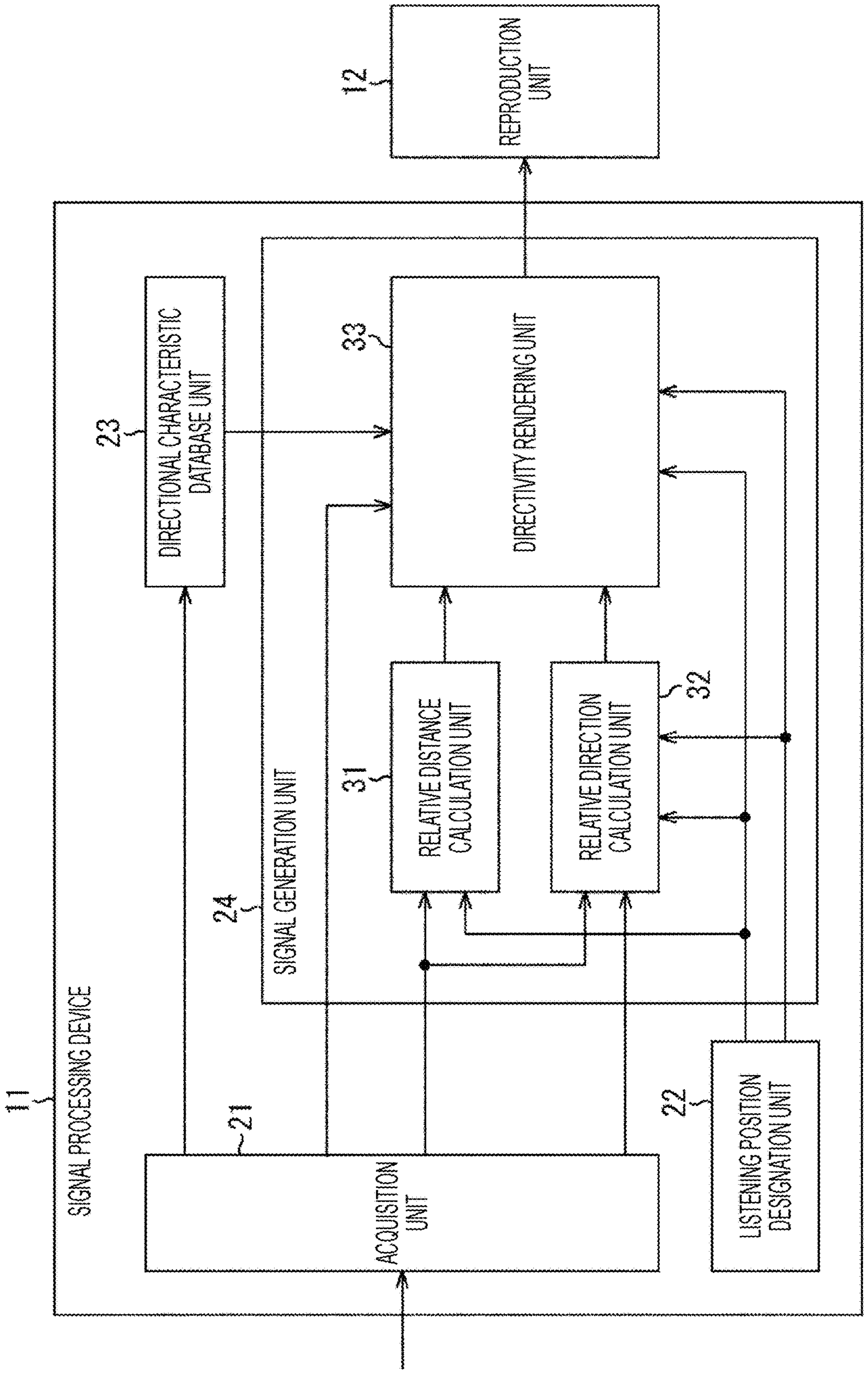
FIG. 5 illustrates a configuration example of a signal processing device.

For example, the signal processing device on the reproduction side is configured as illustrated in FIG. 5.

A signal processing device 11 of FIG. 5 generates a reproduction signal for reproducing a sound of content (object) at a listening position on the basis of the directional characteristic data acquired from the transmission device or the like in advance or shared in advance, and outputs the reproduction signal to a reproduction unit 12.

For example, the signal processing device 11 generates a reproduction signal by performing processing for vector based amplitude panning (VBAP) or wave field synthesis, head related transfer function (HRTF) convolution processing, or the like by using the directional characteristic data.

The reproduction unit 12 includes, for example, headphones, earphones, a speaker array including two or more speakers, and the like, and reproduces a sound of the content on the basis of the reproduction signal supplied from the signal processing device 11.

Further, the signal processing device 11 includes an acquisition unit 21, a listening position designation unit 22, a directional characteristic database unit 23, and a signal generation unit 24.

The acquisition unit 21 acquires the directional characteristic data, the metadata, and the audio data by, for example, receiving data transmitted from the transmission device or reading data from the transmission device connected by wire or the like.

Note that a timing of acquiring the directional characteristic data and a timing of acquiring the metadata and the audio data may be the same or different.

The acquisition unit 21 supplies the acquired directional characteristic data and metadata to the directional characteristic database unit 23 and also supplies the acquired metadata and audio data to the signal generation unit 24.

The listening position designation unit 22 designates a listening position in a target space and a direction of the listener (user) who is at the listening position, and supplies, as the designation result, listening position information indicating the listening position and listener direction information indicating the direction of the listener to the signal generation unit 24.

The directional characteristic database unit 23 records the directional characteristic data for each of a plurality of sound source types supplied from the acquisition unit 21.

Further, in a case where the sound source type information included in the metadata is supplied from the acquisition unit 21, the directional characteristic database unit 23 supplies, among the plurality of pieces of recorded directional characteristic data, directional characteristic data of a sound source type indicated by the supplied sound source type information to the signal generation unit 24.

The signal generation unit 24 generates a reproduction signal on the basis of the metadata and audio data supplied from the acquisition unit 21, the listening position information and listener direction information supplied from the listening position designation unit 22, and the directional characteristic data supplied from the directional characteristic database unit 23, and supplies the reproduction signal to the reproduction unit 12.

The signal generation unit 24 includes a relative distance calculation unit 31, a relative direction calculation unit 32, and a directivity rendering unit 33.

The relative distance calculation unit 31 calculates a relative distance between the listening position (listener) and the object on the basis of the sound source position information included in the metadata supplied from the acquisition unit 21 and the listening position information supplied from the listening position designation unit 22, and supplies relative distance information indicating the calculation result to the directivity rendering unit 33.

The relative direction calculation unit 32 calculates a relative direction between the listener and the object on the basis of the sound source position information and sound source direction information included in the metadata supplied from the acquisition unit 21 and the listening position information and listener direction information supplied from the listening position designation unit 22, and supplies relative direction information indicating the calculation result to the directivity rendering unit 33.

The directivity rendering unit 33 performs rendering processing on the basis of the audio data supplied from the acquisition unit 21, the directional characteristic data supplied from the directional characteristic database unit 23, the relative distance information supplied from the relative distance calculation unit 31, the relative direction information supplied from the relative direction calculation unit 32, and the listening position information and listener direction information supplied from the listening position designation unit 22.

The directivity rendering unit 33 supplies a reproduction signal obtained by the rendering processing to the reproduction unit 12 and causes the reproduction unit 12 to reproduce the sound of the content. For example, the directivity rendering unit 33 performs the processing for VBAP or wave field synthesis, the HRTF convolution processing, or the like as the rendering processing.

<Each Unit of Signal Processing Device>

(Listening Position Designation Unit)

Next, each unit of the signal processing device 11 will be described in more detail.

The listening position designation unit 22 designates the listening position and the direction of the listener in response to a user operation or the like.

For example, in a case of the free-viewpoint content, the user who is viewing the content, that is, the listener operates a graphical user interface (GUI) or the like in a service, an application, or the like that is currently executed, thereby designating an arbitrary listening position or direction of the listener.

In this case, the listening position designation unit 22 sets the listening position and the direction of the listener designated by the user as the listening position (viewpoint position) serving as a viewpoint of the content and the direction in which the listener faces, that is, the direction of the listener as they are.

Further, for example, when the user designates a desired player from a plurality of predetermined players or the like, a position and direction of the player may be set as the listening position and the direction of the listener.

Furthermore, the listening position designation unit 22 may execute some automatic routing program or the like or acquire information indicating the position and direction of the user from a head mounted display including the reproduction unit 12, thereby designating an arbitrary listening position and direction of the listener without receiving a user operation.

As described above, in the free-viewpoint content, the listening position and the direction of the listener are set as an arbitrary position and arbitrary direction that can change with time.

Meanwhile, in the fixed-viewpoint content, the listening position designation unit 22 designates a predetermined fixed position and fixed direction as the listening position and the direction of the listener.

A specific example of the listening position information indicating the listening position is, for example, coordinates ($x_v$, $y_v$, $z_v$) indicating the listening position in an xyz coordinate system indicating an absolute position on the earth's surface or an xyz coordinate system indicating an absolute position in the target space.

Further, for example, the listener direction information can be information including an azimuth angle v and elevation angle $\theta_v$ indicating the absolute direction of the listener in the xyz coordinate system and a tilt angle $\varphi_v$ that is an angle of absolute rotation (tilt) of the listener in the xyz coordinate system, that is, can be an Euler angle.

In particular, in this case, in the fixed-viewpoint content, it is only necessary to set, for example, the listening position information ($x_v$, $y_v$, $z_v$)=(0, 0, 0) and the listener direction information ($\psi_v$, $\theta_v$, $\varphi_v$)=(0, 0, 0).

Note that, hereinafter, description will be continued on the assumption that the listening position information is the coordinates ($x_v$, $y_v$, $z_v$) in the xyz coordinate system and the listener direction information is the Euler angle ($\psi_v$, $\theta_v$, $\varphi_v$).

Similarly, hereinafter, description will be continued on the assumption that the sound source position information is the coordinates ($x_o$, $y_o$, $z_o$) in the xyz coordinate system and the sound source direction information is the Euler angle ($\psi_o$, $\theta_o$, $\varphi_o$).

(Relative Distance Calculation Unit)

The relative distance calculation unit 31 calculates a distance from the listening position to the object as a relative distance $d_o$ for each object included in the content.

Specifically, the relative distance calculation unit 31 obtains the relative distance $d_o$ by calculating the following expression (1) on the basis of the listening position information ($x_v$, $y_v$, $z_v$) and the sound source position information ($x_o$, $y_o$, $z_o$), and outputs relative distance information indicating the obtained relative distance $d_o$.

[Math. 1]

$$d_o = sqrt\left((x_o - x_v)^2 + (y_o - y_v)^2 + (z_o - z_v)^2\right) \quad (1)$$

(Relative Direction Calculation Unit)

Further, the relative direction calculation unit 32 obtains relative direction information indicating a relative direction between the listener and the object.

For example, the relative direction information includes an object azimuth angle $\psi_{i\_obj}$, an object elevation angle $\theta_{i\_obj}$, an object rotation azimuth angle $\psi\_rot_{i\_obj}$, and an object rotation elevation angle $\theta\_rot_{i\_obj}$.

Herein, the object azimuth angle $\psi_{i\_obj}$ and the object elevation angle $\theta_{i\_obj}$ are an azimuth angle and an elevation angle, each of which indicates a relative direction of the object viewed from the listener.

A three-dimensional orthogonal coordinate system, which takes a position indicated by the listening position information ($x_v$, $y_v$, $z_v$) as an origin and is obtained by rotating the xyz coordinate system by an angle indicated by the listener direction information ($\psi_v$, $\theta_v$, $\varphi_v$), will be referred to as a listener coordinate system. In the listener coordinate system, the direction of the listener, that is, a front direction of the listener is set as a +y direction.

At this time, the azimuth angle and elevation angle indicating the direction of the object in the listener coordinate system are the object azimuth angle $\psi_{i\_obj}$ and the object elevation angle $\theta_{i\_obj}$.

Similarly, the object rotation azimuth angle $\psi\_rot_{i\_obj}$ and the object rotation elevation angle $\theta\_rot_{i\_obj}$ are an azimuth angle and an elevation angle, each of which indicates a relative direction of the listener (listening position) viewed from the object. In other words, it can be said that the object rotation azimuth angle $\psi\_rot_{i\_obj}$ and the object rotation elevation angle $\theta\_rot_{i\_obj}$ are information indicating how much a front direction of the object is rotated with respect to the listener.

A three-dimensional orthogonal coordinate system, which takes a position indicated by the sound source position information ($x_o$, $y_o$, $z_o$) as an origin and is obtained by rotating the xyz coordinate system by an angle indicated by the sound source direction information ($\psi_o$, $\theta_o$, $\varphi_o$), will be referred to as an object coordinate system. In the object coordinate system, the direction of the object, that is, the front direction of the object is set as a +y direction.

At this time, the azimuth angle and elevation angle indicating the direction of the listener (listening position) in the object coordinate system are the object rotation azimuth angle $\psi\_rot_{i\_obj}$ and the object rotation elevation angle $\theta\_rot_{i\_obj}$.

Those object rotation azimuth angle $\psi\_rot_{i\_obj}$ and object rotation elevation angle $\theta\_rot_{i\_obj}$ are an azimuth angle and elevation angle used to refer to the directional characteristic data during the rendering processing.

Note that, in the following description, a clockwise direction from the front direction (+y direction) of the azimuth angle in each three-dimensional orthogonal coordinate system such as the xyz coordinate system in the target space, the listener coordinate system, and the object coordinate system is set as a positive direction.

For example, in the xyz coordinate system, an angle that, after a target point such as the object is projected onto an xy plane, indicates a position (direction) of the projected target point based on the +y direction in the xy plane, that is, an angle between a direction of the projected target point and the +y direction is set as the azimuth angle. At this time, the clockwise direction from the +y direction is a positive direction.

Further, in the listener coordinate system or object coordinate system, the direction of the listener or object, that is, the front direction of the listener or object is the +y direction.

An upward direction of the elevation angle in each three-dimensional orthogonal coordinate system such as the xyz coordinate system in the target space, the listener coordinate system, and the object coordinate system is set as a positive direction.

For example, in the xyz coordinate system, an angle between the xy plane and a straight line passing through the origin of the xyz coordinate system and the target point such as the object is the elevation angle.

Further, in a case where the target point such as the object is projected onto the xy plane and a plane including the origin of the xyz coordinate system, the target point, and the projected target point is set as a plane A, a +z direction from the xy plane is set as the positive direction of the elevation angle on the plane A.

Note that, for example, in the case of the listener coordinate system or object coordinate system, the object or listening position serves as the target point.

Further, in a case where, after the elevation angle rotates, the tilt angle in each three-dimensional orthogonal coordinate system such as the xyz coordinate system in the target space, the listener coordinate system, and the object coordinate system rotates in an upper right direction while the +y direction serves as the front direction, such rotation is set as rotation in the positive direction.

Note that, herein, the azimuth angle, the elevation angle, and the tilt angle indicating the listening position, the direction of the object, and the like in the three-dimensional orthogonal coordinate system are defined as described above. However, the present technology is not limited thereto and does not lose generality even in a case where those angles are defined in another way by using quaternion, a rotation matrix, or the like.

Herein, specific examples of the relative distance $d_o$, the object azimuth angle $\psi_{i\_obj}$, the object elevation angle $\theta_{i\_obj}$, the object rotation azimuth angle $\psi\_rot_{i\_obj}$, and the object rotation elevation angle $\theta\_rot_{i\_obj}$ will be described.

First, there will be described a case where only the azimuth angle is considered and the elevation angle and the tilt angle are not considered in the sound source direction information and the listener direction information, that is, a two-dimensional case.

Figure 6:
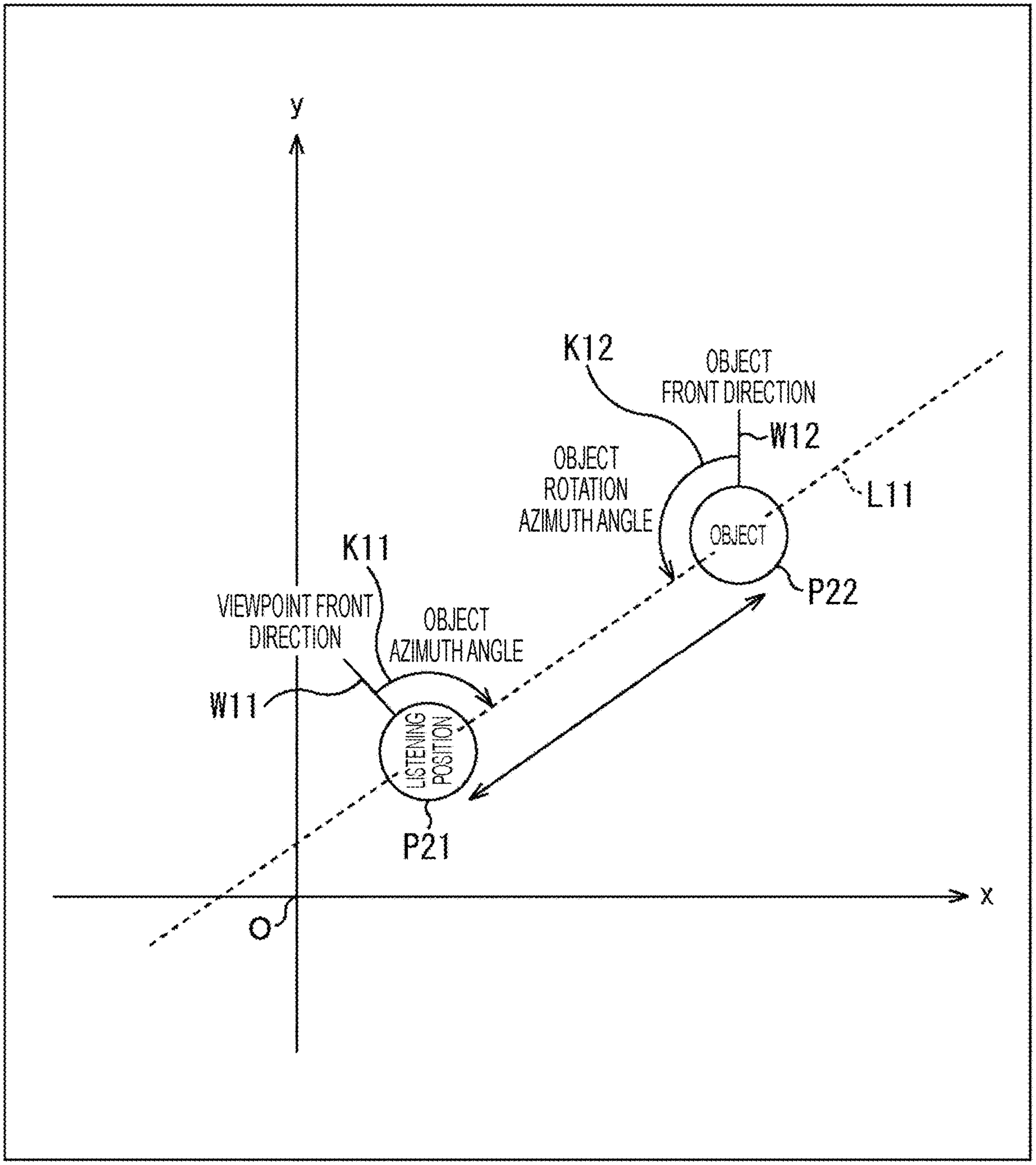
FIG. 6 is an explanatory view of relative direction information.

For example, as illustrated in FIG. 6, a position of a point P21 in an xy coordinate system having an origin O as a reference is set as the listening position, and the object is located at a position of a point P22.

Further, a direction of a line segment W11 passing through the point P21, more specifically, a direction from the point P21 toward an end point of the line segment W11 opposite to the point P21 is set as the direction of the listener.

Similarly, a direction of a line segment W12 passing through the point P22 is set as the direction of the object. Further, a straight line passing through the point P21 and the point P22 is defined as a straight line L11.

In this case, a distance between the point P21 and the point P22 is set as the relative distance $d_o$.

Further, an angle between the line segment W11 and the straight line L11, that is, an angle indicated by an arrow K11 is the object azimuth angle $\psi_{i\_obj}$. Similarly, an angle between the line segment W12 and the straight line L11, that is, an angle indicated by an arrow K12 is the object rotation azimuth angle $\psi\_rot_{i\_obj}$.

Figure 7:
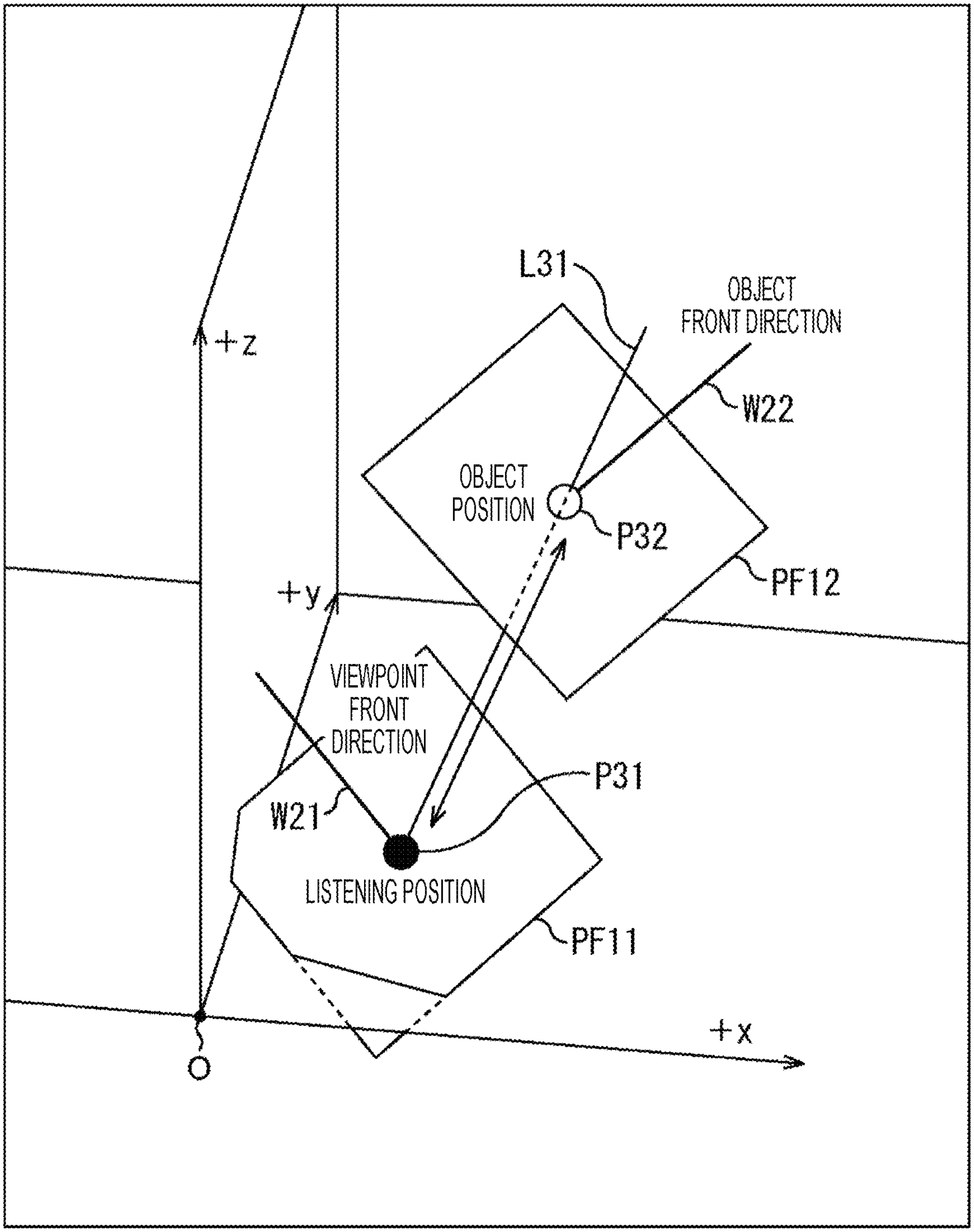
FIG. 7 is an explanatory view of relative direction information.
Figure 8:
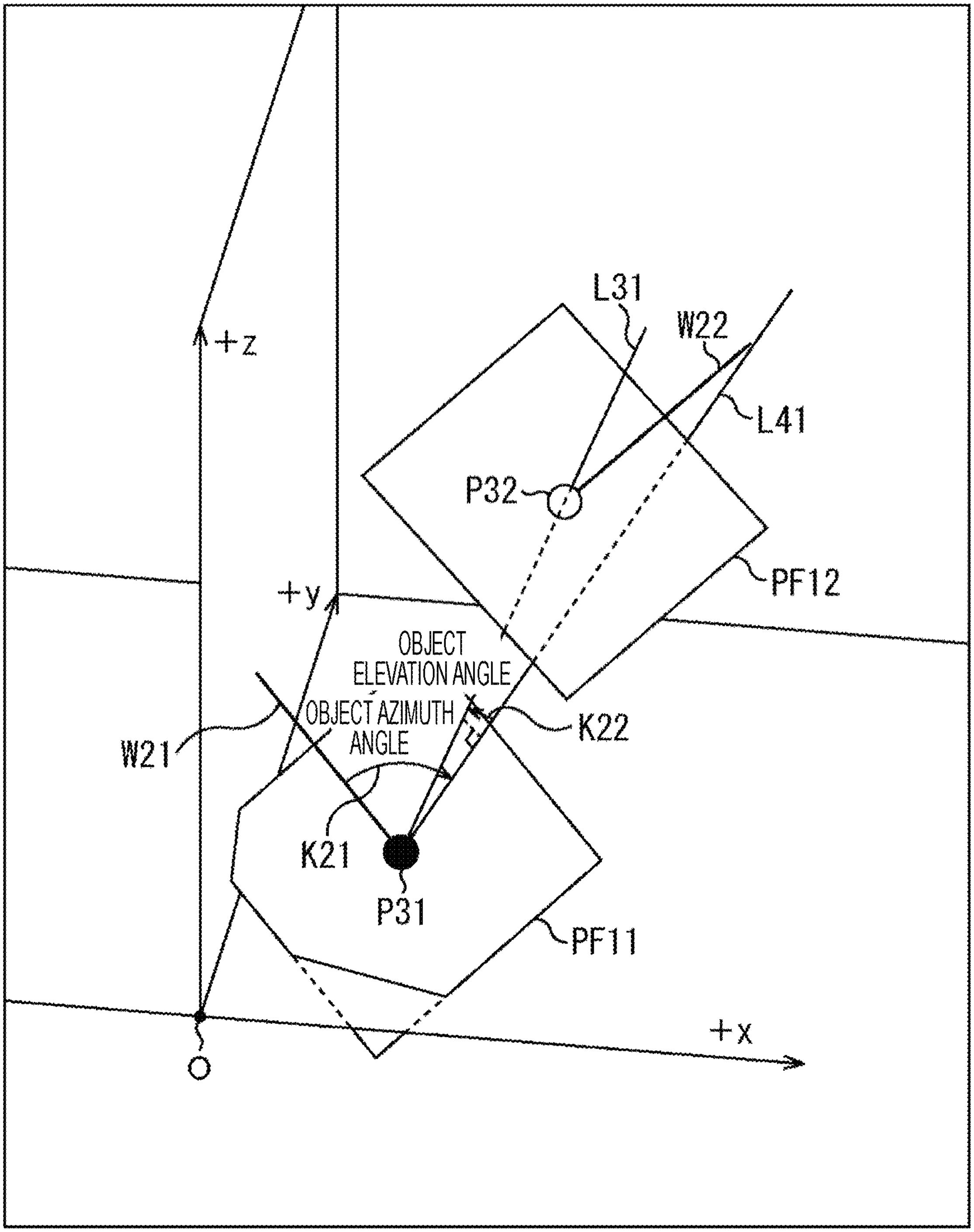
FIG. 8 is an explanatory view of relative direction information.
Figure 9:
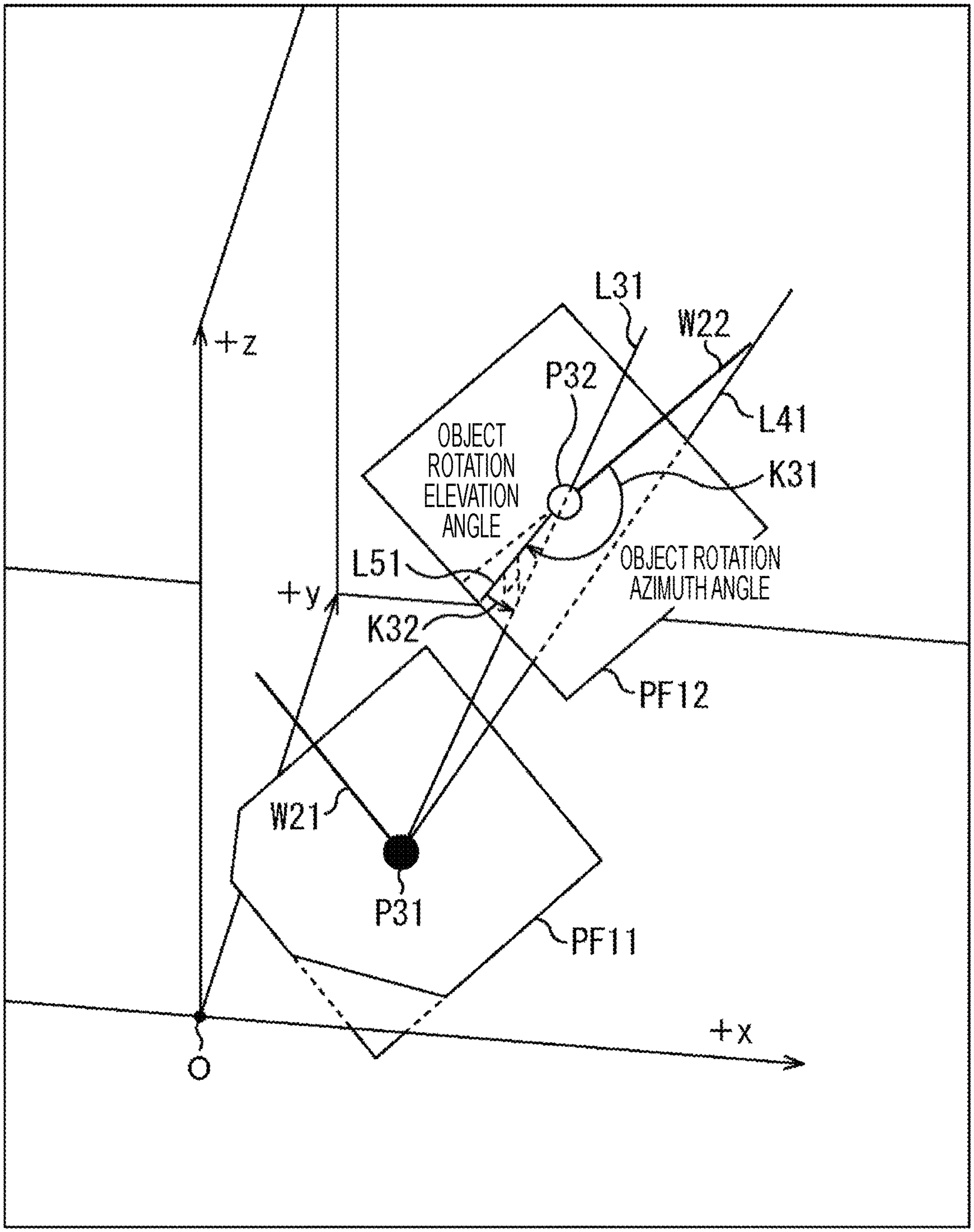
FIG. 9 is an explanatory view of relative direction information.

Further, in a case of a three-dimensional target space, the relative distance $d_o$, the object azimuth angle $\psi_{i\_obj}$, the object elevation angle $\theta_{i\_obj}$, the object rotation azimuth angle $\psi\_rot_{i\_obj}$, and the object rotation elevation angle $\theta\_rot_{i\_obj}$ are as illustrated in FIGS. 7 to 9. Note that corresponding parts in FIGS. 7 to 9 are denoted by the same reference signs, and description thereof will be omitted as appropriate.

For example, as illustrated in FIG. 7, positions of points P31 and P32 in an xyz coordinate system having an origin O as a reference are set as the listening position and the position of the object, respectively, and a straight line passing through the point P31 and the point P32 is set as a straight line L31.

Further, a plane, which is obtained by rotating an xy plane of the xyz coordinate system by an angle indicated by the listener direction information ($\psi_v$, $\theta_v$, $\varphi_v$) and then translating the origin O to a position indicated by the listening position information ($x_v$, $y_v$, $z_v$), is set as a plane PF11. The plane PF11 is an xy plane of the listener coordinate system.

Similarly, a plane, which is obtained by rotating the xy plane of the xyz coordinate system by an angle indicated by the sound source direction information ($\psi_o$, $\theta_o$, $\varphi_o$) and then translating the origin O to a position indicated by the sound source position information ($x_0$, $y_o$, $z_o$), is set as a plane PF12. The plane PF12 is an xy plane of the object coordinate system.

Further, a direction of a line segment W21 passing through the point P31, more specifically, a direction from the point P31 toward an end point of the line segment W21 opposite to the point P31 is set as the direction of the listener indicated by the listener direction information ($\psi_v$, $\theta_v$, $\varphi_v$).

Similarly, a direction of a line segment W22 passing through the point P32 is set as the direction of the object indicated by the sound source direction information ($\psi_o$, $\theta_o$, $\varphi_o$).

In such a case, a distance between the point P31 and the point P32 is set as the relative distance $d_o$.

Further, as illustrated in FIG. 8, in a case were a straight line obtained by projecting the straight line L31 onto the plane PF11 is set as a straight line L41, an angle between the straight line L41 and the line segment W21 on the plane PF11, that is, an angle indicated by an arrow K21 is the object azimuth angle $\psi_{i\_obj}$.

Furthermore, an angle between the straight line L41 and the straight line L31, that is, an angle indicated by an arrow K22 is the object elevation angle $\theta_{i\_obj}$. In other words, the object elevation angle $\theta_{i\_obj}$ is an angle between the plane PF11 and the straight line L31.

Meanwhile, as illustrated in FIG. 9, in a case where a straight line obtained by projecting the straight line L31 onto the plane PF12 is set as a straight line L51, an angle between the straight line L51 and the line segment W22 on the plane PF12, that is, an angle indicated by an arrow K31 is the object rotation azimuth angle $\psi\_rot_{i\_obj}$.

Further, an angle between the straight line L51 and the straight line L31, that is, an angle indicated by an arrow K32 is the object rotation elevation angle $\theta\_rot_{i\_obj}$. In other words, the object rotation elevation angle $\theta\_rot_{i\_obj}$ is an angle between the plane PF12 and the straight line L31.

Specifically, the object azimuth angle $\psi_{i\_obj}$, the object elevation angle $\theta_{i\_obj}$, the object rotation azimuth angle $\psi\_rot_{i\_obj}$, and the object rotation elevation angle $\theta\_rot_{i\_obj}$ described above, that is, the relative direction information can be calculated as follows, for example.

For example, a rotation matrix describing rotation in the three-dimensional space is shown by the following expression (2).

[Math. 2]

$$\begin{pmatrix} x' \\ y' \\ z' \end{pmatrix} = \begin{pmatrix} \cos\psi & 0 & \sin\psi \\ 0 & 1 & 0 \\ -\sin\psi & 0 & \cos\psi \end{pmatrix} \begin{pmatrix} 1 & 0 & 0 \\ 0 & \cos\theta & -\sin\theta \\ 0 & \sin\theta & \cos\theta \end{pmatrix} \begin{pmatrix} \cos\phi & -\sin\phi & 0 \\ \sin\phi & \cos\phi & 0 \\ 0 & 0 & 1 \end{pmatrix} \begin{pmatrix} x \\ y \\ z \end{pmatrix} \quad (2)$$

Note that, in the expression (2), coordinates (x, y, z) in an $X_1Y_1Z_1$ space that is a space of a three-dimensional orthogonal coordinate system having predetermined $X_1$, $Y_1$, and $Z_1$ axes are rotated by the rotation matrix, and rotated coordinates (x', y', z') are obtained.

That is, in the calculation shown by the expression (2), the second matrix from the right on the right side is a rotation matrix for rotating the $X_1Y_1Z_1$ space about the $Z_1$ axis by the angle φ in an $X_1Y_1$ plane to obtain a rotated $X_2Y_2Z_1$ space. In other words, the coordinates (x, y, z) are rotated by an angle −φ on the $X_1Y_1$ plane by the second rotation matrix from the right on the right side.

Further, the third matrix from the right on the right side of the expression (2) is a rotation matrix for rotating the $X_2Y_2Z_1$ space about an $X_2$ axis by the angle θ in a $Y_2Z_1$ plane to obtain a rotated $X_2Y_3Z_2$ space.

Furthermore, the fourth matrix from the right on the right side of the expression (2) is a rotation matrix for rotating the $X_2Y_3Z_2$ space about a $Y_3$ axis by the angle ψ in an $X_2Z_2$ plane to obtain a rotated $X_3Y_3Z_3$ space.

The relative direction calculation unit 32 generates the relative direction information by using the rotation matrixes shown by the expression (2).

Specifically, the relative direction calculation unit 32 calculates the following expression (3) on the basis of the sound source position information ($x_o$, $y_o$, $z_o$) and the listener direction information ($\psi_v$, $\theta_v$, $\varphi_v$), thereby obtaining rotated coordinates ($x_o'$, $y_o'$, $z_o'$) of the coordinates ($x_o$, $y_o$, $z_o$) indicated by the sound source position information.

[Math. 3]

$$\begin{pmatrix} x'_o \\ y'_o \\ z'_o \end{pmatrix} = \begin{pmatrix} \cos\psi & 0 & \sin\psi \\ 0 & 1 & 0 \\ -\sin\psi & 0 & \cos\psi \end{pmatrix} \begin{pmatrix} 1 & 0 & 0 \\ 0 & \cos\theta & -\sin\theta \\ 0 & \sin\theta & \cos\theta \end{pmatrix} \begin{pmatrix} \cos\phi & -\sin\phi & 0 \\ \sin\phi & \cos\phi & 0 \\ 0 & 0 & 1 \end{pmatrix} \begin{pmatrix} x_o \\ y_o \\ z_o \end{pmatrix} \quad (3)$$

In the calculation of the expression (3), $\varphi=-\varphi_v$, $\theta=-\theta_v$, and $\psi=-\psi_v$ are set, and the rotation matrixes are calculated.

The coordinates ($x_o'$, $y_o'$, $z_o'$) thus obtained indicate the position of the object in the listener coordinate system. However, the origin of the listener coordinate system herein is not the listening position but is the origin O of the xyz coordinate system in the target space.

Next, the relative direction calculation unit 32 calculates the following expression (4) on the basis of the listening position information ($x_v$, $y_v$, $z_v$) and the listener direction information ($\psi_v$, $\theta_v$, $\varphi_v$), thereby obtaining rotated coordinates ($x_v'$, $y_v'$, $z_v'$) of the coordinates ($x_v$, $y_v$, $z_v$) indicated by the listening position information.

[Math. 4]

$$\begin{pmatrix} x'_v \\ y'_v \\ z'_v \end{pmatrix} = \begin{pmatrix} \cos\psi & 0 & \sin\psi \\ 0 & 1 & 0 \\ -\sin\psi & 0 & \cos\psi \end{pmatrix} \begin{pmatrix} 1 & 0 & 0 \\ 0 & \cos\theta & -\sin\theta \\ 0 & \sin\theta & \cos\theta \end{pmatrix} \begin{pmatrix} \cos\phi & -\sin\phi & 0 \\ \sin\phi & \cos\phi & 0 \\ 0 & 0 & 1 \end{pmatrix} \begin{pmatrix} x_v \\ y_v \\ z_v \end{pmatrix} \quad (4)$$

In the calculation of the expression (4), $\varphi=-\varphi_v$, $\theta=-\theta_v$, and $\psi=-\psi_v$ are set, and the rotation matrixes are calculated.

The coordinates ($x_v'$, $y_v'$, $z_v'$) thus obtained indicate the listening position in the listener coordinate system. However, the origin of the listener coordinate system herein is not the listening position but is the origin O of the xyz coordinate system in the target space.

Further, the relative direction calculation unit 32 calculates the following expression (5) on the basis of the coordinates ($x_o'$, $y_o'$, $z_o'$) calculated from the expression (3) and the coordinates ($x_v'$, $y_v'$, $z_v'$) calculated from the expression (4).

[Math. 5]

$$\begin{pmatrix} x''_o \\ y''_o \\ z''_o \end{pmatrix} = \begin{pmatrix} x'_o \\ y'_o \\ z'_o \end{pmatrix} - \begin{pmatrix} x'_v \\ y'_v \\ z'_v \end{pmatrix} \quad (5)$$

The expression (5) is calculated to obtain coordinates ($x_o''$, $y_o''$, $z_o''$) indicating the position of the object in the listener coordinate system taking the listening position as the origin. The coordinates ($x_o''$, $y_o''$, $z_o''$) indicate a relative position of the object viewed from the listener.

The relative direction calculation unit 32 calculates the following expressions (6) and (7) on the basis of the coordinates ($x_o''$, $y_o''$, $z_o''$) obtained as described above, thereby obtaining the object azimuth angle $\psi_{i\_obj}$ and the object elevation angle $\theta_{i\_obj}$.

[Math. 6]

$$\psi_{i\_obj} = \arctan(y''_o / x''_o) \quad (6)$$

[Math. 7]

$$\theta_{i\_obj} = \arctan\left(z''_o \middle/ sqrt\left(x''^2_o + y''^2_o\right)\right) \quad (7)$$

In the expression (6), the object azimuth angle $\psi_{i\_obj}$ is obtained on the basis of $x_o''$ and $y_o''$ that are the x coordinate and the y coordinate.

Note that, more specifically, in the calculation of the expression (6), the object azimuth angle $\psi_{i\_obj}$ is calculated by performing proof-by-cases processing on the basis of a sign of $y_o''$ and a result of zero determination on $x_o''$ and performing exception processing on the basis of a result of the proof by cases. However, detailed description thereof will be omitted herein.

Further, in the expression (7), the object elevation angle $\theta_{i\_obj}$ is obtained on the basis of the coordinates ($x_o''$, $y_o''$, $z_o''$). Note that, more specifically, in the calculation of the expression (7), the object elevation angle $\theta_{i\_obj}$ is calculated by performing proof-by-cases processing on the basis of a sign of $z_o''$ and a result of zero determination on ($x_o''^2+y_o''^2$) and performing exception processing on the basis of a result of the proof by cases. However, detailed description thereof will be omitted herein.

In a case where the object azimuth angle $\psi_{i\_obj}$ and the object elevation angle $\theta_{i\_obj}$ are obtained by the above calculation, the relative direction calculation unit 32 performs similar calculation to obtain the object rotation azimuth angle $\psi\_rot_{i\_obj}$ and the object rotation elevation angle $\theta\_rot_{i\_obj}$.

That is, the relative direction calculation unit 32 calculates the following expression (8) on the basis of the listening position information ($x_v$, $y_v$, $z_v$) and the sound source direction information ($\psi_o$, $\theta_o$, $\varphi_o$), thereby obtaining the rotated coordinates ($x_v'$, $y_v'$, $z_v'$) of the coordinates ($x_v$, $y_v$, $z_v$) indicated by the listening position information.

[Math. 8]

$$\begin{pmatrix} x_v' \\ y_v' \\ z_v' \end{pmatrix} = \begin{pmatrix} \cos\psi & 0 & \sin\psi \\ 0 & 1 & 0 \\ -\sin\psi & 0 & \cos\psi \end{pmatrix} \begin{pmatrix} 1 & 0 & 0 \\ 0 & \cos\theta & -\sin\theta \\ 0 & \sin\theta & \cos\theta \end{pmatrix} \begin{pmatrix} \cos\phi & -\sin\phi & 0 \\ \sin\phi & \cos\phi & 0 \\ 0 & 0 & 1 \end{pmatrix} \begin{pmatrix} x_v \\ y_v \\ z_v \end{pmatrix} \quad (8)$$

In the calculation of the expression (8), $\varphi=-\varphi_o$, $\theta=-\theta_o$, and $\psi=-\psi_o$ are set, and the rotation matrixes are calculated.

The coordinates ($x_v'$, $y_v'$, $z_v'$) thus obtained indicate the listening position (position of the listener) in the object coordinate system. However, the origin of the object coordinate system herein is not the position of the object but is the origin O of the xyz coordinate system in the target space.

Next, the relative direction calculation unit 32 calculates the following expression (9) on the basis of the sound source position information ($x_o$, $y_o$, $z_o$) and the sound source direction information ($\psi_o$, $\theta_o$, $\varphi_o$), thereby obtaining the rotated coordinates ($x_o'$, $y_o'$, $z_o'$) of the coordinates ($x_o$, $y_o$, $z_o$) indicated by the sound source position information.

[Math. 9]

$$\begin{pmatrix} x_o' \\ y_o' \\ z_o' \end{pmatrix} = \begin{pmatrix} \cos\psi & 0 & \sin\psi \\ 0 & 1 & 0 \\ -\sin\psi & 0 & \cos\psi \end{pmatrix} \begin{pmatrix} 1 & 0 & 0 \\ 0 & \cos\theta & -\sin\theta \\ 0 & \sin\theta & \cos\theta \end{pmatrix} \begin{pmatrix} \cos\phi & -\sin\phi & 0 \\ \sin\phi & \cos\phi & 0 \\ 0 & 0 & 1 \end{pmatrix} \begin{pmatrix} x_o \\ y_o \\ z_o \end{pmatrix} \quad (9)$$

In the calculation of the expression (9), $\varphi=-\varphi_o$, $\theta=-\theta_o$, and $\psi=-\psi_o$ are set, and the rotation matrixes are calculated.

The coordinates ($x_o'$, $y_o'$, $z_o'$) thus obtained indicate the position of the object in the object coordinate system. However, the origin of the object coordinate system herein is not the position of the object but is the origin O of the xyz coordinate system in the target space.

Further, the relative direction calculation unit 32 calculates the following expression (10) on the basis of the coordinates ($x_v'$, $y_v'$, $z_v'$) calculated from the expression (8) and the coordinates ($x_o'$, $y_o'$, $z_o'$) calculated from the expression (9).

[Math. 10]

$$\begin{pmatrix} x_v'' \\ y_v'' \\ z_v'' \end{pmatrix} = \begin{pmatrix} x_v' \\ y_v' \\ z_v' \end{pmatrix} - \begin{pmatrix} x_o' \\ y_o' \\ z_o' \end{pmatrix} \quad (10)$$

The expression (10) is calculated to obtain coordinates ($x_v''$, $y_v''$, $z_v''$) indicating the listening position in the object coordinate system taking the position of the object as the origin. The coordinates ($x_v''$, $y_v''$, $z_v''$) indicate a relative position of the listening position viewed from the object.

The relative direction calculation unit 32 calculates the following expressions (11) and (12) on the basis of the coordinates ($x_v''$, $y_v''$, $z_v''$) obtained as described above, thereby obtaining the object rotation azimuth angle $\psi\_rot_{i\_obj}$ and the object rotation elevation angle $\theta\_rot_{i\_obj}$.

[Math. 11]

$$\psi\_rot_{i\_obj} = \arctan(y_v''/x_v'') \quad (11)$$

[Math. 12]

$$\theta\_rot_{i\_obj} = \arctan(z_v''/sqrt(x_v''^2 + y_v''^2)) \quad (12)$$

The expression (11) is calculated in a similar manner to the expression (6) to obtain the object rotation azimuth angle $\psi\_rot_{i\_obj}$. Further, the expression (12) is calculated in a similar manner to the expression (7) to obtain the object rotation elevation angle $\theta\_rot_{i\_obj}$.

The relative direction calculation unit 32 performs the processing described above on each frame of the audio data for the plurality of objects.

Therefore, it is possible to obtain the relative direction information including the object azimuth angle $\psi_{i\_obj}$, the object elevation angle $\theta_{i\_obj}$, the object rotation azimuth angle $\psi\_rot_{i\_obj}$, and the object rotation elevation angle $\theta\_rot_{i\_obj}$ of each object for each frame.

Using the relative direction information obtained as described above makes it possible to localize a sound image of each object in accordance with the listening position, the direction of the listener, and movement and rotation of the object, thereby providing a higher realistic feeling.

(Directional Characteristic Database Unit)

The directional characteristic database unit 23 records directional characteristic data for each type of object, that is, for each sound source type.

The directional characteristic data is, for example, a function that uses the azimuth angle and elevation angle viewed from the object as arguments and obtains a gain in a propagation direction and a spherical harmonic coefficient indicated by the azimuth angle and elevation angle.

Note that, instead of the function, the directional characteristic data may be data in a table format, that is, for example, a table in which the azimuth angle and elevation angle viewed from the object are associated with the gain in the propagation direction and the spherical harmonic coefficient indicated by the azimuth angle and elevation angle.

(Directivity Rendering Unit)

The directivity rendering unit 33 performs rendering processing on the basis of the audio data of each object, the directional characteristic data, the relative distance information, and the relative direction information obtained for each object, the listening position information, and the listener direction information, and generates a reproduction signal for the corresponding reproduction unit 12 serving as a target device.

<Description of Content Reproduction Processing>

Next, an operation of the signal processing device 11 will be described.

Figure 10:
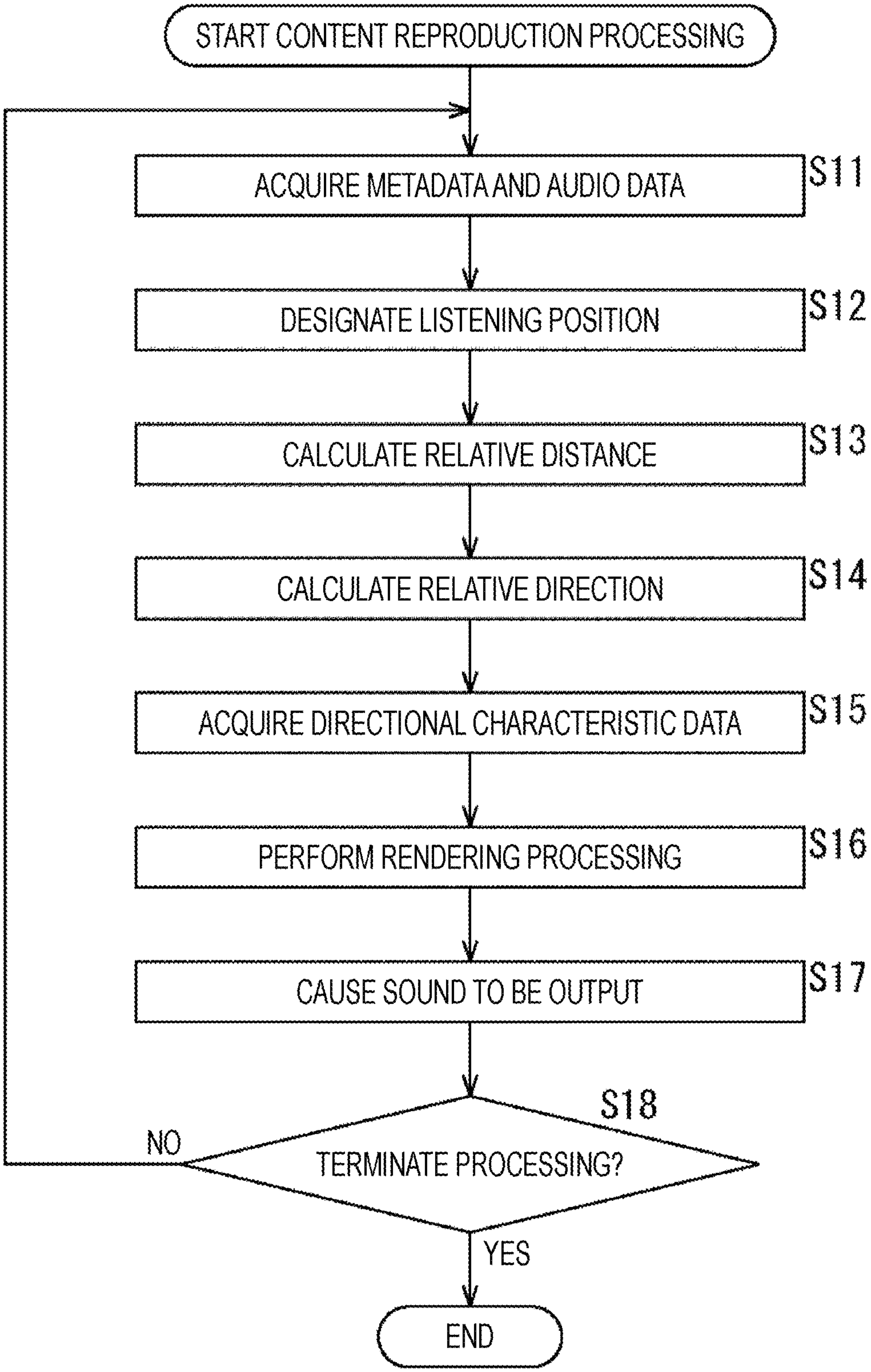
FIG. 10 is a flowchart showing content reproduction processing.

That is, the content reproduction processing performed by the signal processing device 11 will be described below with reference to a flowchart of FIG. 10.

Note that, herein, description will be provided on the assumption that content to be reproduced is free-viewpoint content and directional characteristic data of each sound source type is acquired and recorded in advance in the directional characteristic database unit 23.

In step S11, the acquisition unit 21 acquires metadata and audio data for one frame of each object included in the content from the transmission device. In other words, the metadata and audio data are acquired at predetermined time intervals.

The acquisition unit 21 supplies sound source type information included in the acquired metadata of each object to the directional characteristic database unit 23, and supplies the acquired audio data of each object to the directivity rendering unit 33.

Further, the acquisition unit 21 supplies sound source position information ($x_o$, $y_o$, $z_o$) included in the acquired metadata of each object to the relative distance calculation unit 31 and the relative direction calculation unit 32, and supplies sound source direction information ($\psi_o$, $\theta_o$, $\varphi_o$) included in the acquired metadata of each object to the relative direction calculation unit 32.

In step S12, the listening position designation unit 22 designates a listening position and a direction of the listener.

That is, the listening position designation unit 22 determines the listening position and the direction of the listener in response to an operation or the like of the listener, and generates listening position information ($x_v$, $y_v$, $z_v$) and listener direction information ($\psi_v$, $\theta_v$, $\varphi_v$) indicating the determination result.

The listening position designation unit 22 supplies the resultant listening position information ($x_v$, $y_v$, $z_v$) to the relative distance calculation unit 31, the relative direction calculation unit 32, and the directivity rendering unit 33, and supplies the resultant listener direction information ($\psi_v$, $\theta_v$, $\varphi_v$) to the relative direction calculation unit 32 and the directivity rendering unit 33.

Note that, in a case of fixed-viewpoint content, for example, the listening position information is set to (0, 0, 0), and the listener direction information is also set to (0, 0, 0).

In step S13, the relative distance calculation unit 31 calculates a relative distance $d_o$ on the basis of the sound source position information ($x_o$, $y_o$, $z_o$) supplied from the acquisition unit 21 and the listening position information ($x_v$, $y_v$, $z_v$) supplied from the listening position designation unit 22, and supplies relative distance information indicating the calculation result to the directivity rendering unit 33. For example, in step S13, the expression (1) described above is calculated for each object, and the relative distance $d_o$ is calculated for each object.

In step S14, the relative direction calculation unit 32 calculates a relative direction between the listener and the object on the basis of the sound source position information ($x_o$, $y_o$, $z_o$) and sound source direction information ($\psi_o$, $\theta_o$, $\varphi_o$) supplied from the acquisition unit 21 and the listening position information ($x_v$, $y_v$, $z_v$) and listener direction information ($\psi_v$, $\theta_v$, $\varphi_v$) supplied from the listening position designation unit 22, and supplies relative direction information indicating the calculation result to the directivity rendering unit 33.

For example, the relative direction calculation unit 32 calculates the expressions (3) to (7) described above for each object, thereby obtaining the object azimuth angle $\psi_{i\_obj}$ and the object elevation angle $\theta_{i\_obj}$ for each object.

Further, for example, the relative direction calculation unit 32 calculates the expressions (8) to (12) described above for each object, thereby obtaining the object rotation azimuth angle $\psi\_rot_{i\_obj}$ and the object rotation elevation angle $\theta\_rot_{i\_obj}$ for each object.

The relative direction calculation unit 32 supplies information including the object azimuth angle $\psi_{i\_obj}$, the object elevation angle $\theta_{i\_obj}$, the object rotation azimuth angle $\psi\_rot_{i\_obj}$, and the object rotation elevation angle $\theta\_rot_{i\_obj}$ obtained for each object as the relative direction information to the directivity rendering unit 33.

In step S15, the directivity rendering unit 33 acquires the directional characteristic data from the directional characteristic database unit 23.

For example, in a case where the metadata is acquired for each object in step S11 and the sound source type information included in the metadata is supplied to the directional characteristic database unit 23, the directional characteristic database unit 23 outputs the directional characteristic data for each object.

That is, the directional characteristic database unit 23 reads, for each piece of the sound source type information supplied from the acquisition unit 21, the directional characteristic data of the sound source type indicated by the sound source type information from the plurality of pieces of recorded directional characteristic data, and outputs the directional characteristic data to the directivity rendering unit 33.

The directivity rendering unit 33 acquires the directional characteristic data output for each object from the directional characteristic database unit 23 as described above, thereby obtaining the directional characteristic data of each object.

In step S16, the directivity rendering unit 33 performs rendering processing on the basis of the audio data supplied from the acquisition unit 21, the directional characteristic data supplied from the directional characteristic database unit 23, the relative distance information supplied from the relative distance calculation unit 31, the relative direction information supplied from the relative direction calculation unit 32, and the listening position information ($x_v$, $y_v$, $z_v$) and listener direction information ($\psi_v$, $\theta_v$, $\varphi_v$) supplied from the listening position designation unit 22.

Note that the listening position information ($x_v$, $y_v$, $z_v$) and the listener direction information ($\psi_v$, $\theta_v$, $\varphi_v$) only need to be used for the rendering processing as necessary, and may not necessarily be used for the rendering processing.

For example, the directivity rendering unit 33 performs the processing for VBAP or wave field synthesis, the HRTF convolution processing, or the like as the rendering processing, thereby generating a reproduction signal for reproducing a sound of the object (content) at the listening position.

Herein, an example of performing VBAP as the rendering processing will be described. Therefore, in this case, the reproduction unit 12 includes a plurality of speakers.

Further, an example where a single object is included in the content will be described herein for simplicity of description.

First, the directivity rendering unit 33 calculates the following expression (13) on the basis of the relative distance $d_o$ indicated by the relative distance information, thereby obtaining a gain value $gain_{i\_obj}$ for reproducing distance attenuation.

[Math. 13]

$$gain_{i\_obj} = 1.0/\mathrm{power}(d_0, 2.0) \quad (13)$$

Note that power ($d_o$, 2.0) in the expression (13) represents a function for calculating a square value of the relative distance $d_o$. Herein, an example of using an inverse-square law will be described. However, calculation of the gain value for reproducing the distance attenuation is not limited thereto, and any other method may be used.

Next, the directivity rendering unit 33 calculates, for example, the following expression (14) on the basis of the object rotation azimuth angle $\psi\_rot_{i\_obj}$ and the object rotation elevation angle $\theta\_rot_{i\_obj}$ included in the relative direction information, thereby obtaining a gain value $dir\_gain_{i\_obj}$ according to the directional characteristic of the object.

[Math. 14]

$$\mathrm{dir\_gain}_{i\_obj} = dir(i, \psi\_\mathrm{rot}_{i\_obj}, \theta\_\mathrm{rot}_{i\_obj}) \tag{14}$$

In the expression (14), dir(i, $\psi\_rot_{i\_obj}$, $\theta\_rot_{i\_obj}$) represents a gain function corresponding to a value i of the sound source type information supplied as the directional characteristic data.

Therefore, the directivity rendering unit 33 calculates the expression (14) by substituting the object rotation azimuth angle $\psi\_rot_{i\_obj}$ and the object rotation elevation angle $\theta\_rot_{i\_obj}$ into the gain function, thereby obtaining the gain value $dir\_gain_{i\_obj}$ as the calculation result.

That is, in the expression (14), the gain value $dir\_gain_{i\_obj}$ is obtained from the object rotation azimuth angle $\varphi\_rot_{i\_obj}$, the object rotation elevation angle $\theta\_rot_{i\_obj}$, and the directional characteristic data.

The gain value $dir\_gain_{i\_obj}$ obtained as described above achieves gain correction for adding a transfer characteristic of a sound propagating from the object toward the listener, in other words, gain correction for reproducing sound propagation according to the directional characteristic of the object.

Note that a distance from the object may be included as an argument (variable) of the gain function serving as the directional characteristic data as described above, thereby achieving gain correction that reproduces not only the directional characteristic but also the distance attenuation by using the gain value $dir\_gain_{i\_obj}$ that is an output of the gain function. In this case, the relative distance $d_o$ indicated by the relative distance information is used as the distance that is the argument of the gain function.

Further, the directivity rendering unit 33 obtains a reproduction gain value $VBAP\_gain_{i\_spk}$ of a channel corresponding to each of the plurality of speakers included in the reproduction unit 12 by performing VBAP on the basis of the object azimuth angle $\psi_{i\_obj}$ and object elevation angle $\theta_{i\_obj}$ included in the relative direction information.

Then, the directivity rendering unit 33 calculates the following expression (15) on the basis of audio data $obj\_audio_{i\_obj}$ of the object, the gain value $gain_{i\_obj}$ of the distance attenuation, the gain value $dir\_gain_{i\_obj}$ of the directional characteristic, and the reproduction gain value $VBAP\_gain_{i\_spk}$ of the channel corresponding to the speaker, thereby obtaining a reproduction signal $speaker\_signal_{i\_spk}$ to be supplied to the speaker.

[Math. 15]

$$\mathrm{speaker\_signal}_{i\_spk} = \mathrm{obj\_audio}_{i\_obj} \times \mathrm{VBAP\_gain}_{i\_spk} \times \mathrm{gain}_{i\_obj} \times \mathrm{dir\_gain}_{i\_obj} \tag{15}$$

Herein, the expression (15) is calculated for each combination of the speaker included in the reproduction unit 12 and the object included in the content, and the reproduction signal $speaker\_signal_{i\_spk}$ is obtained for each of the plurality of speakers included in the reproduction unit 12.

Therefore, the gain correction for reproducing the distance attenuation, the gain correction for reproducing sound propagation according to the directional characteristic, and the processing of VBAP for localizing a sound image at a desired position are achieved.

Meanwhile, in a case where the gain value $dir\_gain_{i\_obj}$ obtained from the directional characteristic data is a gain value in which both the directional characteristic and the distance attenuation are considered, that is, in a case where the relative distance $d_o$ indicated by the relative distance information is included as an argument of the gain function, the following expression (16) is calculated.

That is, the directivity rendering unit 33 calculates the following expression (16) on the basis of the audio data $obj\_audio_{i\_obj}$ of the object, the gain value $dir\_gain_{i\_obj}$ of the directional characteristic, and the reproduction gain value $VBAP\_gain_{i\_spk}$, thereby obtaining the reproduction signal $speaker\_signal_{i\_spk}$.

[Math. 16]

$$\mathrm{speaker\_signal}_{i\_spk} = \mathrm{obj\_audio}_{i\_obj} \times \mathrm{VBAP\_gain}_{i\_spk} \times \mathrm{dir\_gain}_{i\_obj} \tag{16}$$

In a case where the reproduction signal is obtained as described above, the directivity rendering unit 33 finally performs overlap addition of the reproduction signal $speaker\_signal_{i\_spk}$ obtained for the current frame with the reproduction signal $speaker\_signal_{i\_spk}$ of a previous frame of the current frame, thereby obtaining a final reproduction signal.

Note that the example of performing VBAP as the rendering processing has been described herein, but, also in a case where the HRTF convolution processing is performed as the rendering processing, reproduction signals can be obtained by performing similar processing.

Herein, there will be described a case where reproduction signals of headphones are generated in consideration of the directional characteristic of the object by using an HRTF database including an HRTF for each user according to the distance, azimuth angle, and elevation angle indicating a relative positional relationship between the object and the user (listener).

In particular, herein, the directivity rendering unit 33 holds the HRTF database including an HRTF from a virtual speaker corresponding to a real speaker used when measuring the HRTF, and the reproduction unit 12 is headphones.

Note that a case where the HRTF database is prepared for each user in consideration of a difference in a personal characteristic of each user will be described herein. However, an HRTF database common to all users may be used.

In this example, a personal ID information for identifying an individual user is set as j, and azimuth angles and elevation angles indicating directions of arrival of a sound from a sound source (virtual speaker), that is, from the object to ears of the user will be denoted by $\psi_L$ and $\psi_R$ and $\theta_L$ and $\theta_R$, respectively. Herein, the azimuth angle $\psi_L$ and the elevation angle $\theta_L$ are an azimuth angle and elevation angle indicating a direction of arrival to a left ear of the user, and the azimuth angle $\psi_R$ and the elevation angle $\theta_R$ are an azimuth angle and elevation angle indicating a direction of arrival to a right ear of the user.

Further, an HRTF serving as a transfer characteristic from the sound source to the left ear of the user will be particularly denoted by HRTF(j, $\psi_L$, $\theta_L$), and an HRTF serving as a transfer characteristic from the sound source to the right ear of the user will be particularly denoted by HRTF(j, $\psi_R$, $\theta_R$).

Note that the HRTF to each of the left and right ears of the user may be prepared for each direction of arrival and distance from the sound source, and the distance attenuation may also be reproduced by HRTF convolution.

Further, the directional characteristic data may be a function indicating a transfer characteristic from the sound source to each direction or may be a gain function as in the example of VBAP described above, and, in either case, the object rotation azimuth angle $\psi\_rot_{i\_obj}$ and the object rotation elevation angle $\theta\_rot_{i\_obj}$ are used as arguments of the function.

In addition, the object rotation azimuth angle and the object rotation elevation angle may be obtained for each of the left and right ears in consideration of a convergence angle between the left and right ears of the user with respect to the object, that is, a difference in an angle of arrival of a sound between the object and each ear of the user caused by a facial width of the user.

The convergence angle herein is an angle between a straight line connecting the left ear of the user (listener) and the object and a straight line connecting the right ear of the user and the object.

Hereinafter, among the object rotation azimuth angles and the object rotation elevation angles included in the relative direction information, the object rotation azimuth angle and object rotation elevation angle obtained for the left ear of the user will be particularly denoted by $\psi\_rot_{i\_obj\_1}$ and $\theta\_rot_{i\_obj\_1}$, respectively.

Similarly, hereinafter, among the object rotation azimuth angles and the object rotation elevation angles included in the relative direction information, the object rotation azimuth angle and object rotation elevation angle obtained for the right ear of the user will be particularly denoted by $\psi\_rot_{i\_obj\_r}$ and $\theta\_rot_{i\_obj\_r}$, respectively.

First, the directivity rendering unit 33 calculates the expression (13) described above, thereby obtaining the gain value $gain_{i\_obj}$ for reproducing the distance attenuation.

Note that, in a case where the HRTF is prepared for each direction of arrival of a sound and distance from the sound source as the HRTF database and the distance attenuation can be reproduced by the HRTF convolution, the gain value $gain_{i\_obj}$ is not calculated. In addition, the distance attenuation may be reproduced by convolution of the transfer characteristic obtained from the directional characteristic data, instead of the HRTF convolution.

Next, the directivity rendering unit 33 acquires the transfer characteristic according to the directional characteristic of the object on the basis of, for example, the directional characteristic data and the relative direction information.

For example, in a case where a function for obtaining the transfer characteristic is supplied as the directional characteristic data and the function uses a distance, azimuth angle, and elevation angle as arguments, the directivity rendering unit 33 calculates the following expressions (17) on the basis of the relative distance information, the relative direction information, and the directional characteristic data.

[Math. 17]

$$\begin{aligned} \text{dir\_func}_{i\_obj\_l} &= dir(i, d_{i\_obj}, \psi\_\text{rot}_{i\_obj\_l}, \theta\_\text{rot}_{i\_obj\_l}) \\ \text{dir\_func}_{i\_obj\_r} &= dir(i, d_{i\_obj}, \psi\_\text{rot}_{i\_obj\_r}, \theta\_\text{rot}_{i\_obj\_r}) \end{aligned} \tag{17}$$

That is, in the expressions (17), the directivity rendering unit 33 sets the relative distance $d_o$ indicated by the relative distance information as $d_{i\_obj}$.

Then, the directivity rendering unit 33 substitutes the relative distance $d_o$, the object rotation azimuth angle $\psi\_rot_{i\_obj\_l}$, and the object rotation elevation angle $\theta\_rot_{i\_obj\_l}$ into a function dir(i, $d_{i\_obj}$, $\psi\_rot_{i\_obj\_l}$, $\theta\_rot_{i\_obj\_l}$) for the left ear supplied as the directional characteristic data, thereby obtaining a transfer characteristic $dir\_func_{i\_obj\_l}$ of the left ear.

Similarly, the directivity rendering unit 33 substitutes the relative distance $d_o$, the object rotation azimuth angle $\psi\_rot_{i\_obj\_r}$, and the object rotation elevation angle $\theta\_rot_{i\_obj\_r}$ into a function dir(i, $d_{i\_obj}$, $\psi\_rot_{i\_obj\_r}$, $\theta\_rot_{i\_obj\_r}$) for the right ear supplied as the directional characteristic data, thereby obtaining a transfer characteristic $dir\_func_{i\_obj\_r}$ of the right ear.

In this case, the distance attenuation is also reproduced by convolution of the transfer characteristics $dir\_func_{i\_obj\_l}$ and $dir\_func_{i\_obj\_r}$.

Further, the directivity rendering unit 33 obtains the HRTF(j, $\psi_L$, $\theta_L$) for the left ear and the HRTF(j, $\psi_R$, $\theta_R$) for the right ear from the held HRTF database on the basis of the object azimuth angle $\psi_{i\_obj}$ and the object elevation angle $\theta_{i\_obj}$. Herein, for example, the HRTF(j, $\psi_L$, $\theta_L$) in which $\psi_L=\psi_{i\_obj}$ and $\theta_L=\theta_{i\_obj}$ are set is read from the HRTF database. Note that the object azimuth angle and the object elevation angle may also be obtained for each of the left and right ears.

In a case where the transfer characteristics and HRTFs of the left and right ears are obtained by the above processing, reproduction signals for the left and right ears to be supplied to the headphones serving as the reproduction unit 12 are obtained on the basis of the transfer characteristics, the HRTFs, and the audio data $obj\_audio_{i\_obj}$ of the object.

Specifically, for example, in a case where the transfer characteristics $dir\_func_{i\_obj\_l}$ and $dir\_func_{i\_obj\_r}$ are obtained from the directional characteristic data in consideration of both the directional characteristic and the distance attenuation, that is, in a case where the transfer characteristics are obtained from the expressions (17), the directivity rendering unit 33 calculates the following expressions (18) to obtain a reproduction signal $HPout_L$ for the left ear and a reproduction signal $HPout_R$ for the right ear.

[Math. 18]

$$\begin{aligned} HP_{out_L} &= \text{obj\_audio}_{i\_obj} * \text{dir\_func}_{i\_obj\_l} * HRTF(j, \psi_L, \theta_L) \\ HP_{out_R} &= \text{obj\_audio}_{i\_obj} * \text{dir\_func}_{i\_obj\_r} * HRTF(j, \psi_R, \theta_R) \end{aligned} \tag{18}$$

Note that, in the expressions (18), * represents convolution processing.

Therefore, herein, the transfer characteristic $dir\_func_{i\_obj\_l}$ and the HRTF(j, $\psi_L$, $\theta_L$) are convolved to the audio data $obj\_audio_{i\_obj}$ to obtain the reproduction signal $HPout_L$ for the left ear. Similarly, the transfer characteristic $dir\_func_{i\_obj\_r}$ and the HRTF(j, $\psi_R$, $\theta_R$) are convolved to the audio data $obj\_audio_{i\_obj}$ to obtain the reproduction signal $HPout_R$ for the right ear. Further, also in a case where the distance attenuation is reproduced by the HRTFs, the reproduction signals are obtained by calculation similar to that of the expressions (18).

Meanwhile, for example, in a case where the transfer characteristics obtained from the directional characteristic data and the HRTFs are obtained without considering the distance attenuation, the directivity rendering unit 33 calculates the following expressions (19) to obtain reproduction signals.

[Math. 19]

$$HPout_L = \text{obj\_audio}_{i\_obj} * \text{dir\_func}_{i\_obj\_l} * HRTF(j, \psi_L, \theta_L) * \text{gain}_{i\_obj} \quad (19)$$
$$HPout_R = \text{obj\_audio}_{i\_obj} * \text{dir\_func}_{i\_obj\_r} * HRTF(j, \psi_R, \theta_R) * \text{gain}_{i\_obj}$$

In the expressions (19), the audio data $\text{obj\_audio}_{i\_obj}$ is subjected not only to the convolution processing performed in the expressions (18) but also to processing for convolving the gain value $\text{gain}_{i\_obj}$ for reproducing the distance attenuation. Therefore, the reproduction signal $HPout_L$ for the left ear and the reproduction signal $HPout_R$ for the right ear are obtained. The gain value $\text{gain}_{i\_obj}$ is obtained from the expression (13) described above.

In a case where the reproduction signals $HPout_L$ and $HPout_R$ are obtained by the above processing, the directivity rendering unit 33 performs overlap addition of the reproduction signals with reproduction signals of the previous frame, thereby obtaining final reproduction signals $HPout_L$ and $HPout_R$.

Further, in a case where the processing for wave field synthesis is performed as the rendering processing, that is, in a case where a sound field including a sound of the object is formed by wave field synthesis by using a plurality of speakers serving as the reproduction unit 12, reproduction signals are generated as follows.

Herein, there will be described an example where speaker drive signals to be supplied to the speakers included in the reproduction unit 12 are generated as reproduction signals by using spherical harmonics.

An external sound field at a position outside a certain radius r from a predetermined sound source, that is, at a position where a radius (distance) from the sound source is r' (where r'>r) and an azimuth angle and elevation angle indicating a direction viewed from the sound source are ψ and θ, that is, a sound pressure p(r', ψ, θ) can be shown by the following expression (20).

[Math. 20]

$$p(r', \psi, \theta) = \sum_{n=0}^{\infty} \sum_{m=-n}^{n} P_{nm}(r) \frac{h_n^{(1)}(kr')}{h_n^{(1)}(kr)} Y_n^m(\psi, \theta) X(k) \quad (20)$$

Note that, in the expression (20), $Y_n^m(\psi, \theta)$ represents a spherical harmonic function, and n and m represent a degree and order of the spherical harmonic function. Further, $h_n^{(1)}(kr)$ is a Hankel function of the first kind, and k represents a wave number.

Furthermore, in the expression (20), X(k) represents a reproduction signal represented in a frequency domain, and $P_{nm}(r)$ represents a spherical harmonic spectrum of a sphere having a radius (distance) r. Herein, the signal X(k) in the frequency domain corresponds to the audio data of the object.

For example, in a case where a measurement microphone array for measuring a directional characteristic has a spherical shape having the radius r, a sound pressure at a position of the radius r of a sound propagating in all directions from the sound source existing at the center of the sphere (measurement microphone array) can be measured by using the measurement microphone array. In particular, because the directional characteristic varies depending on the sound source, an observation sound including directional characteristic information is obtained by measuring the sound from the sound source at each position.

The spherical harmonic spectrum $P_{nm}(r)$ can be shown by the following expression (21) by using such a measured observation sound pressure p(r, ψ, θ) measured by the measurement microphone array.

[Math. 21]

$$P_{nm}(r) = \int_{\partial\Omega} p(r, \psi, \theta) Y_n^m(\psi, \theta) * dr \quad (21)$$

Note that, in the expression (21), ∂Ω represents an integral range and particularly represents an integral on the radius r.

Such a spherical harmonic spectrum $P_{nm}(r)$ is data indicating the directional characteristic of the sound source. Therefore, in a case where, for example, the spherical harmonic spectrum $P_{nm}(r)$ of each combination of the degree n and the order m in a predetermined domain is measured in advance for each sound source type, it is possible to use a function shown by the following expression (22) as directional characteristic data dir(i_obj, $d_{i\_obj}$).

[Math. 22]

$$dir(\text{i\_obj}, d_{i\_obj}) = P_{nm}(r) \frac{h_n^{(1)}(kd_{i\_obj})}{h_n^{(1)}(kr)} \quad (22)$$

Note that, in the expression (22), i_obj represents a sound source type, $d_{i\_obj}$ represents a distance from the sound source, and the distance $d_{i\_obj}$ corresponds to the relative distance $d_o$. Such a set of pieces of the directional characteristic data dir(i_obj, $d_{i\_obj}$) of the respective degrees n and orders m is data indicating the transfer characteristic in each direction determined on the basis of the azimuth angle ψ and the elevation angle θ in consideration of an amplitude and a phase, that is, in all directions.

In a case where the relative positional relationship between the object and the listening position does not change, a reproduction signal in which the directional characteristic is also considered can be obtained from the expression (20) described above.

However, even in a case where the relative positional relationship between the object and the listening position changes, a sound pressure p($d_{i\_obj}$, ψ, θ) at a point ($d_{i\_obj}$, ψ, θ) determined on the basis of the azimuth angle ψ, the elevation angle θ, and the distance $d_{i\_obj}$ can be obtained by subjecting the directional characteristic data dir(i_obj, $d_{i\_obj}$) to a rotation operation based on the object rotation azimuth angle $\psi\_rot_{i\_obj}$ and the object rotation elevation angle $\theta\_rot_{i\_obj}$, as shown by the following expression (23).

[Math. 23]

$$p(d_{i\_obj}, \psi, \theta) = \sum_{n=0}^{\infty} \sum_{m=-n}^{n} P_{nm}(r) \frac{h_n^{(1)}(kd_{i\_obj})}{h_n^{(1)}(kr)} Y_n^m(\psi + \psi\_rot_{i\_obj}, \theta + \theta\_rot_{i\_obj}) X(k) \quad (23)$$

Note that, in the calculation of the expression (23), the relative distance $d_o$ is substituted into the distance $d_{i\_obj}$ and the audio data of the object is substituted into X(k), and thus the sound pressure $p(d_{i\_obj}, \psi, \theta)$ is obtained for each wave number (frequency) k. Then, the sum of the sound pressures $p(d_{i\_obj}, \psi, \theta)$ of each object, which are obtained for the respective wave numbers k, is calculated to obtain a signal of the sound observed at the point $(d_{i\_obj}, \psi, \theta)$, that is, a reproduction signal.

Therefore, in order to generate reproduction signals for wave field synthesis, the expression (23) is calculated for each wave number k for each object as the processing in step S16, and reproduction signals are generated on the basis of the calculation result.

In a case where the reproduction signals to be supplied to the reproduction unit 12 are obtained by the rendering processing described above, the processing proceeds from step S16 to step S17.

In step S17, the directivity rendering unit 33 supplies the reproduction signals obtained by the rendering processing to the reproduction unit 12 and causes the reproduction unit 12 to output a sound. Therefore, the sound of the content, that is, the sound of the object is reproduced.

In step S18, the signal generation unit 24 determines whether or not to terminate the processing of reproducing the sound of the content. For example, in a case where the processing is performed on all the frames and reproduction of the content ends, it is determined that the processing is to be terminated.

In a case where it is determined in step S18 that the processing is not terminated yet, the processing returns to step S11, and the processing described above is repeatedly performed.

Meanwhile, in a case where it is determined in step S18 that the processing is to be terminated, the content reproduction processing is terminated.

As described above, the signal processing device 11 generates the relative distance information and the relative direction information and performs the rendering processing in consideration of the directional characteristic by using the relative distance information and the relative direction information. This makes it possible to reproduce sound propagation according to the directional characteristic of the object, thereby providing a higher realistic feeling.

<Configuration Example of Computer>

By the way, the series of processing described above can be executed by hardware or software. In a case where the series of processing is executed by software, a program forming the software is installed in a computer. Herein, the computer includes, for example, a computer built in dedicated hardware, a general-purpose personal computer that can execute various functions by installing various programs, and the like.

Figure 11:
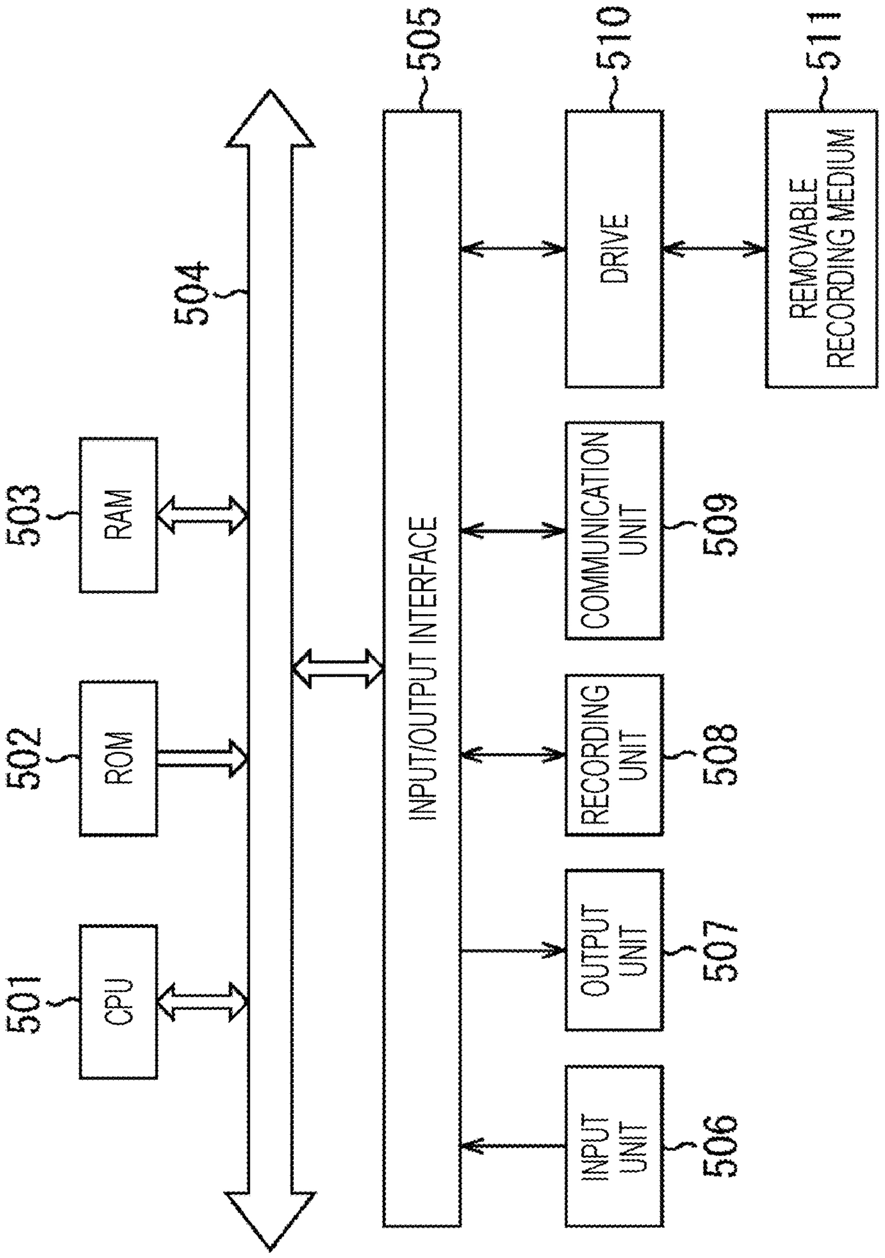
FIG. 11 illustrates a configuration example of a computer.

FIG. 11 is a block diagram illustrating a configuration example of hardware of a computer that executes the series of processing described above by a program.

A central processing unit (CPU) 501, a read only memory (ROM) 502, and a random access memory (RAM) 503 are connected to each other by a bus 504 in the computer.

The bus 504 is further connected to an input/output interface 505. The input/output interface 505 is connected to an input unit 506, an output unit 507, a recording unit 508, a communication unit 509, and a drive 510.

The input unit 506 includes a keyboard, mouse, microphone, imaging element, and the like. The output unit 507 includes a display, speaker, and the like. The recording unit 508 includes a hard disk, nonvolatile memory, and the like. The communication unit 509 includes a network interface and the like. The drive 510 drives a removable recording medium 511 such as a magnetic disk, optical disk, magneto-optical disk, or semiconductor memory.

In the computer configured as described above, the series of processing described above is performed by, for example, the CPU 501 loading a program recorded in the recording unit 508 into the RAM 503 via the input/output interface 505 and the bus 504 and executing the program.

The program executed by the computer (CPU 501) can be provided by, for example, being recorded on the removable recording medium 511 as a package medium or the like. Further, the program can be provided via a wired or wireless transmission medium such as a local area network, the Internet, or digital satellite broadcasting.

In the computer, the program can be installed in the recording unit 508 via the input/output interface 505 by attaching the removable recording medium 511 to the drive 510. Further, the program can be received by the communication unit 509 via the wired or wireless transmission medium and be installed in the recording unit 508. In addition, the program can be installed in the ROM 502 or recording unit 508 in advance.

Note that the program executed by the computer may be a program in which the processing is performed in time series in the order described in the present specification, or may be a program in which the processing is performed in parallel or at a necessary timing such as when a call is made.

Further, the embodiments of the present technology are not limited to the above embodiments, and can be variously modified without departing from the gist of the present technology.

For example, the present technology can have a configuration of cloud computing in which a single function is shared and jointly processed by a plurality of devices via a network.

Further, each of the steps described in the above flowchart can be executed by a single device, or can be executed by being shared by a plurality of devices.

Furthermore, in a case where a single step includes a plurality of processes, the plurality of processes included in the single step can be executed by a single device or can be executed by being shared by a plurality of devices.

Still further, the present technology can also have the following configurations.

(1)

A signal processing device including:

an acquisition unit that acquires audio data of an audio object and metadata including position information indicating a position of the audio object and direction information indicating a direction of the audio object; and a signal generation unit that generates a reproduction signal for reproducing a sound of the audio object at a listening position on the basis of listening position information indicating the listening position, listener direction information indicating a direction of a listener at the listening position, the position information, the direction information, and the audio data.

(2)

The signal processing device according to (1), in which the acquisition unit acquires the metadata at predetermined time intervals.

(3)

The signal processing device according to (1) or (2), in which the signal generation unit generates the reproduction signal on the basis of directional characteristic data indicating a directional characteristic of the audio object, the listening position information, the listener direction information, the position information, the direction information, and the audio data.

(4)

The signal processing device according to (3), in which the signal generation unit generates the reproduction signal on the basis of the directional characteristic data determined for a type of the audio object.

(5)

The signal processing device according to (3) or (4), in which the direction information includes an azimuth angle indicating the direction of the audio object.

(6)

The signal processing device according to (3) or (4), in which the direction information includes an azimuth angle and elevation angle indicating the direction of the audio object.

(7)

The signal processing device according to (3) or (4), in which the direction information includes an azimuth angle and elevation angle indicating the direction of the audio object and a tilt angle indicating rotation of the audio object.

(8)

The signal processing device according to any one of (3) to (7), in which the listening position information indicates the listening position that is determined in advance and is fixed, and the listener direction information indicates the direction of the listener that is determined in advance and is fixed.

(9)

The signal processing device according to (8), in which the position information includes an azimuth angle and elevation angle indicating the direction of the audio object viewed from the listening position and a radius indicating a distance from the listening position to the audio object.

(10)

The signal processing device according to any one of (3) to (7), in which the listening position information indicates the listening position that is arbitrarily determined, and the listener direction information indicates the direction of the listener that is arbitrarily determined.

(11)

The signal processing device according to (10), in which the position information is coordinates of an orthogonal coordinate system indicating the position of the audio object.

(12)

The signal processing device according to any one of (3) to (11), in which the signal generation unit generates the reproduction signal on the basis of the directional characteristic data, relative distance information obtained on the basis of the listening position information and the position information and indicating a relative distance between the audio object and the listening position, relative direction information obtained on the basis of the listening position information, the listener direction information, the position information, and the direction information and indicating a relative direction between the audio object and the listener, and the audio data (13)

The signal processing device according to (12), in which the relative direction information includes an azimuth angle and elevation angle indicating the relative direction between the audio object and the listener.

(14)

The signal processing device according to (12) or (13), in which the relative direction information includes information indicating the direction of the listener viewed from the audio object and information indicating the direction of the audio object viewed from the listener.

(15)

The signal processing device according to (14), in which the signal generation unit generates the reproduction signal on the basis of information indicating a transfer characteristic of the direction of the listener viewed from the audio object, the information being obtained on the basis of the directional characteristic data and the information indicating the direction of the listener viewed from the audio object (16)

A signal processing method including causing a signal processing device to acquire audio data of an audio object and metadata including position information indicating a position of the audio object and direction information indicating a direction of the audio object, and generate a reproduction signal for reproducing a sound of the audio object at a listening position on the basis of listening position information indicating the listening position, listener direction information indicating a direction of a listener at the listening position, the position information, the direction information, and the audio data.

(17)

A program for causing a computer to execute processing including:

a step of acquiring audio data of an audio object and metadata including position information indicating a position of the audio object and direction information indicating a direction of the audio object; and a step of generating a reproduction signal for reproducing a sound of the audio object at a listening position on the basis of listening position information indicating the listening position, listener direction information indicating a direction of a listener at the listening position, the position information, the direction information, and the audio data.

REFERENCE SIGNS LIST

11 Signal processing device
21 Acquisition unit
22 Listening position designation unit
23 Directional characteristic database unit
24 Signal generation unit
31 Relative distance calculation unit
32 Relative direction calculation unit
33 Directivity rendering unit

The invention claimed is:

1. A signal processing device comprising:

An audio data acquirer that acquires audio data of an audio object and metadata including position information indicating a position of the audio object and direction information indicating a direction of the audio object; and a signal generator that generates a reproduction signal for reproducing a sound of the audio object at a listening position on a basis of listening position information indicating the listening position, listener direction information indicating a direction of a listener at the listening position, the position information, the direction information, and the audio data, wherein the signal generator generates the reproduction signal on a basis of directional characteristic data indicating a directional characteristic of the audio object, the listening position information, the listener direction information, the position information, the direction information, and the audio data; and the directional characteristic data has a value of an ID indicating the audio object type, an azimuth angle and elevation angle indicating a direction viewed from the audio object, and a distance from the audio object as arguments of function.

2. The signal processing device according to claim 1, wherein the audio data acquirer acquires the metadata at predetermined time intervals.

3. The signal processing device according to claim 1, wherein the signal generator generates the reproduction signal on a basis of the directional characteristic data determined for a type of the audio object.

4. The signal processing device according to claim 1, wherein the direction information includes an azimuth angle indicating the direction of the audio object.

5. The signal processing device according to claim 1, wherein the direction information includes an azimuth angle and elevation angle indicating the direction of the audio object.

6. The signal processing device according to claim 1, wherein the direction information includes an azimuth angle and elevation angle indicating the direction of the audio object and a tilt angle indicating rotation of the audio object.

7. The signal processing device according to claim 1, wherein the listening position information indicates the listening position that is determined in advance and is fixed, and the listener direction information indicates the direction of the listener that is determined in advance and is fixed.

8. The signal processing device according to claim 7, wherein the position information includes an azimuth angle and elevation angle indicating the direction of the audio object viewed from the listening position and a radius indicating a distance from the listening position to the audio object.

9. The signal processing device according to claim 1, wherein the listening position information indicates the listening position that is arbitrarily determined, and the listener direction information indicates the direction of the listener that is arbitrarily determined.

10. The signal processing device according to claim 9, wherein the position information is coordinates of an orthogonal coordinate system indicating the position of the audio object.

11. The signal processing device according to claim 1, wherein the signal generator generates the reproduction signal on a basis of the directional characteristic data, relative distance information obtained on a basis of the listening position information and the position information and indicating a relative distance between the audio object and the listening position, relative direction information obtained on a basis of the listening position information, the listener direction information, the position information, and the direction information and indicating a relative direction between the audio object and the listener, and the audio data.

12. The signal processing device according to claim 11, wherein the relative direction information includes an azimuth angle and elevation angle indicating the relative direction between the audio object and the listener.

13. The signal processing device according to claim 11, wherein the relative direction information includes information indicating the direction of the listener viewed from the audio object and information indicating the direction of the audio object viewed from the listener.

14. The signal processing device according to claim 13, wherein the signal generator generates the reproduction signal on a basis of information indicating a transfer characteristic of the direction of the listener viewed from the audio object, the information being obtained on a basis of the directional characteristic data and the information indicating the direction of the listener viewed from the audio object.

15. A signal processing method comprising:

causing a signal processing device to acquire audio data of an audio object and metadata including position information indicating a position of the audio object and direction information indicating a direction of the audio object, and generate a reproduction signal for reproducing a sound of the audio object at a listening position on a basis of listening position information indicating the listening position, listener direction information indicating a direction of a listener at the listening position, the position information, the direction information, and the audio data, wherein the reproduction signal is generated on a basis of directional characteristic data indicating a directional characteristic of the audio object, the listening position information, the listener direction information, the position information, the direction information, and the audio data; and the directional characteristic data has a value of an ID indicating the audio object type, an azimuth angle and elevation angle indicating a direction viewed from the audio object, and a distance from the audio object as arguments of function.

16. The signal processing device according to claim 15, wherein the reproduction signal is generated on a basis of the directional characteristic data, relative distance information obtained on a basis of the listening position information and the position information and indicating a relative distance between the audio object and the listening position, relative direction information obtained on a basis of the listening position information, the listener direction information, the position information, and the direction information and indicating a relative direction between the audio object and the listener, and the audio data.

17. The signal processing device according to claim 16, wherein the relative direction information includes an azimuth angle and elevation angle indicating the relative direction between the audio object and the listener.

18. A non-transitory computer readable medium storing instructions that, when executed by a computer, cause the computer to execute the processes of:

acquiring audio data of an audio object and metadata including position information indicating a position of the audio object and direction information indicating a direction of the audio object; and generating a reproduction signal for reproducing a sound of the audio object at a listening position on a basis of listening position information indicating the listening position, listener direction information indicating a direction of a listener at the listening position, the position information, the direction information, and the audio data, wherein the reproduction signal is generated on a basis of directional characteristic data indicating a directional characteristic of the audio object, the listening position information, the listener direction information, the position information, the direction information, and the audio data; and the directional characteristic data has a value of an ID indicating the audio object type, an azimuth angle and elevation angle indicating a direction viewed from the audio object, and a distance from the audio object as arguments of function.

19. The signal processing device according to claim 18, wherein the reproduction signal is generated on a basis of the directional characteristic data, relative distance information obtained on a basis of the listening position information and the position information and indicating a relative distance between the audio object and the listening position, relative direction information obtained on a basis of the listening position information, the listener direction information, the position information, and the direction information and indicating a relative direction between the audio object and the listener, and the audio data.

20. The signal processing device according to claim 19, wherein the relative direction information includes an azimuth angle and elevation angle indicating the relative direction between the audio object and the listener.

* * * * *